(12) United States Patent
Eom

(10) Patent No.: US 7,658,462 B2
(45) Date of Patent: Feb. 9, 2010

(54) APPARATUS TO CONTROL COLOR REGISTRATION AND IMAGE DENSITY

(75) Inventor: Yoon-seop Eom, Gyeonggi-do (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 1435 days.

(21) Appl. No.: 10/232,314

(22) Filed: Sep. 3, 2002

(65) Prior Publication Data

US 2003/0053093 A1  Mar. 20, 2003

(30) Foreign Application Priority Data

Sep. 4, 2001  (KR) ............................... 2001-54151

(51) Int. Cl.
 *B41J 29/393* (2006.01)
(52) U.S. Cl. ............................. 347/19; 347/116; 347/15
(58) Field of Classification Search ................. 347/116, 347/19, 15; 399/301
 See application file for complete search history.

(56) References Cited

U.S. PATENT DOCUMENTS

| | | | |
|---|---|---|---|
| 5,241,328 A | 8/1993 | Sarraf et al. | |
| 5,241,400 A | 8/1993 | Itagaki | |
| 5,287,162 A * | 2/1994 | de Jong et al. | 399/49 |
| 5,303,037 A | 4/1994 | Taranowski | |
| 5,412,409 A | 5/1995 | Costanza | |
| 5,450,119 A | 9/1995 | Hinton et al. | |
| 5,493,321 A * | 2/1996 | Zwadlo | 347/131 |
| 5,550,625 A | 8/1996 | Takamatsu et al. | |
| 5,574,527 A | 11/1996 | Folkins | |
| 5,625,402 A | 4/1997 | Sarraf | |
| 5,631,686 A | 5/1997 | Castelli et al. | |
| 5,909,235 A | 6/1999 | Folkins | |

(Continued)

FOREIGN PATENT DOCUMENTS

JP  63-271275  10/1988

(Continued)

OTHER PUBLICATIONS

Japanese Office Action dated Apr. 4, 2006 issued with respect to Japanese Patent Application No. 2002-254531.

(Continued)

*Primary Examiner*—Manish S Shah
*Assistant Examiner*—Laura E Martin
(74) *Attorney, Agent, or Firm*—Staas & Halsey LLP

(57) ABSTRACT

An apparatus to control color registration and image density and a method of calculating a color registration error. The apparatus includes registration marks formed on a transfer belt such that each of the registration marks includes a scan direction component and a slanting direction component at an angle with respect to both the scan direction and the cross-scan direction. The apparatus further includes image density marks formed on the transfer belt, having predetermined image densities, and a registration and image density sensor provided above the registration marks and the image density marks to radiate beams onto the registration marks and the image density marks. The sensor receives beams reflected from the registration marks and the image density marks to produce detection signals, and obtains registration information and image density information from the detection signals. Accordingly, X-offset, Y-offset, printing width error, and skew can be simultaneously compensated for using a single apparatus.

23 Claims, 17 Drawing Sheets

U.S. PATENT DOCUMENTS

| | | | |
|---|---|---|---|
| 5,946,537 A * | 8/1999 | Nakayasu et al. | 399/301 |
| 6,115,512 A | 9/2000 | Tsukamoto et al. | |
| 6,198,549 B1 | 3/2001 | Decker et al. | |
| 6,303,937 B1 * | 10/2001 | Kerr et al. | 250/503.1 |
| 2001/0004425 A1 * | 6/2001 | Shinohara et al. | 399/301 |
| 2001/0042468 A1 * | 11/2001 | Inoue et al. | 101/335 |
| 2003/0001945 A1 * | 1/2003 | Maeda | 347/252 |
| 2003/0156148 A1 | 8/2003 | King et al. | |

FOREIGN PATENT DOCUMENTS

| | | |
|---|---|---|
| JP | 1-207764 | 8/1989 |
| JP | 6-1002 | 1/1994 |
| JP | 6-106779 | 4/1994 |
| JP | 6-191019 | 7/1994 |
| JP | 7-214761 | 8/1995 |
| JP | 8-15930 | 1/1996 |
| JP | 8-69146 | 3/1996 |
| JP | 8-278680 | 10/1996 |
| JP | 9-160334 | 6/1997 |
| JP | 09-247452 | 9/1997 |
| JP | 9-265192 | 10/1997 |
| JP | 10-076703 | 3/1998 |
| JP | 10-142880 | 5/1998 |
| JP | 10-260567 | 9/1998 |
| JP | 10-282763 | 10/1998 |
| JP | 11-157134 | 6/1999 |
| JP | 11-190920 | 7/1999 |
| JP | 2000-147915 | 5/2000 |
| JP | 2000-155455 | 6/2000 |
| JP | 2000-231233 | 8/2000 |
| JP | 2000-275915 | 10/2000 |
| JP | 2000-275926 | 10/2000 |
| JP | 2001-194851 | 7/2001 |
| JP | 2001-209292 | 8/2001 |
| KR | 93-25272 | 12/1993 |
| KR | 92014199 | 5/1998 |
| KR | 1999-23342 | 3/1999 |

OTHER PUBLICATIONS

Japanese Office Action dated Aug. 16, 2005.
Japanese Office Action for corresponding Japanese Patent Application No. 2002-254531 dated Apr. 7, 2009 (2 pgs).
Japanese Office Action for corresponding Japanese Patent Application No. 028990 dated Jan. 22, 2008 (2 pgs).

* cited by examiner

TIME

APPARATUS TO CONTROL COLOR REGISTRATION AND IMAGE DENSITY

CROSS-REFERENCE TO RELATED APPLICATIONS

This application claims the benefit of Korean Application No. 2001-54151, filed Sep. 4, 2001, in the Korean Industrial Property Office, the disclosure of which is incorporated herein by reference.

BACKGROUND OF THE INVENTION

1. Field of the Invention

The present invention relates to an apparatus to control color registration and image density in a printer, and a method of calculating color registration error, and more particularly, to a color registration control apparatus to accurately detect color registration to provide a high quality picture, a method of calculating color registration error, and an apparatus to simultaneously detect both color registration and image density.

2. Description of the Related Art

Image forming apparatuses such as printers and copy machines form a latent electrostatic image by charging a photoconductive member on a transfer belt and performing selective exposure by scanning a laser beam, develop the latent electrostatic image using colored toners and a developer unit, and transfer the developed latent electrostatic image to a recording medium by pressing and heating, thereby forming an image.

Generally, the colors of toners used in a developer unit are cyan (C), magenta (M), yellow (Y), and black (K). The four color toners are transferred such that the four colors overlap to form a complete image. To deliver high quality images, unit images of individual colors should be accurately superimposed. This superimposition of colors is referred to as color registration.

Color registration errors can arise from complex causes such as mismatch of the individual color units of a developer unit, errors in processing an optical lens, and motion errors of a transfer belt. Particularly, color registration error becomes a problem in an image forming apparatus having a serial structure including a plurality of developer units.

Color registration errors have four types: X-offset, Y-offset, printing width error, and skew. X-offset arises in a scan direction in which a sensor scans. Y-offset arises in a cross-scan direction in which a transfer belt moves. Printing width errors arise from a difference in width of an image area. Skew arises from displacement of a development line. In order to obtain high quality images using color registration, a sensor to detect color registration errors and a method of accurately calculating the errors are required.

FIG. 1 is a diagram of a color registration sensor and a mark pattern disclosed in U.S. Pat. No. 5,287,162. Referring to FIG. 1, a color registration mark pattern 13 in a chevron shape is formed on a transfer belt (not shown). A split sensor 11 including two split cells 11a and 11b detects a beam reflected from the color registration mark pattern 13. Reference numeral 32 indicates a cross scan direction.

The split sensor 11 includes the two split cells 11a and 11b and is designed to compare the amount of light reflected from the color registration mark pattern 13 and detected by the cell 11a, with the amount of light reflected from the color registration mark pattern 13 and detected by the cell 11b, to produce an output when the quantities are the same.

The split sensor 11 must be aligned parallel to the color registration mark pattern 13, and formed in a chevron shape to detect different colored chevron marks. Accordingly, the split sensor 11 is expensive. In addition, when the split sensor 11 is not parallel to the color registration mark pattern 13, beams reflected from the color registration mark pattern 13 cannot be accurately detected.

FIG. 2 is a diagram of a color registration sensor and a mark pattern disclosed in U.S. Pat. No. 5,631,686. Referring to FIG. 2, a black swath 17 is laid on an intermediate transfer belt 19. Marks 25 corresponding to yellow, cyan, and magenta are formed on the black swath 17 in a chevron shape. A black mark 23 can be made by forming a void on the black swath 17. A bicell sensor 21 is provided above the intermediate transfer belt 19.

The bicell sensor 21 detects the marks corresponding to yellow, cyan, and magenta based on the difference between the low reflectivity of the black mark 23 and the high reflectivity of each of the marks of different colors, and detects the black mark 23 based on the difference between the low reflectivity of the black mark 23 and the high reflectivity of the intermediate transfer belt 19.

The bicell sensor 21 can easily detect the black mark 23 due to the great difference between the reflectivity of the black mark 23 and the reflectivity of the marks 25 corresponding to yellow, cyan, and magenta, but has difficulty detecting the marks 25 corresponding to yellow, cyan, and magenta since the difference in reflectivity between the marks 25 is small.

FIG. 3 is a diagram of a color registration sensor and a mark pattern disclosed in U.S. Pat. No. 5,909,235. Referring to FIG. 3, color registration mark sets 33 and 35 are provided at one side of a transfer belt 29. A wide area beam (WAB) sensor 31 to detect beams reflected from the color registration mark sets 33 and 35 is provided on the transfer belt 29. Here, reference numerals 72 and 34 denote image areas. Reference characters X and Y denote a scan direction and a cross-scan direction, respectively.

For each of the color registration mark sets 33 and 35, a plurality of black marks are formed first, and yellow, cyan and magenta marks are arranged in line with each of the black marks.

The WAB sensor 31 radiates beams at the color registration mark sets 33 and 35, measures the reflectivity of the color registration mark sets 33 and 35, and compares the areas of reflected beams with each other, thereby producing a detection signal. The WAB sensor 31 does not focus beams on the color registration mark sets 33 and 35, but diffusely radiates beams onto sets 33 and 35 to detect beams reflected therefrom.

Since the WAB sensor 31 diffusely radiates beams, all of the beams regularly and irregularly reflected from the color registration mark sets 33 and 35 are detected. Accordingly, detection errors having noise components may increase according to the surrounding conditions of the transfer belt 29. In addition, radiated beams have multiple wavelength bands, so the sensitivity of the WAB sensor 31 is not uniform for different wavelengths. As a result, the light receiving sensitivity of the WAB sensor 31 is not uniform, which decreases the accuracy of a detection signal.

In addition to color registration, i.e., arrangement of colors in juxtaposition, it is also necessary to appropriately adjust image density in order to obtain high quality images. Conventionally, a sensor such as a color registration sensor to detect color registration and a sensor such as a color toner density (CTD) sensor to detect image density are separate, so color registration error and image density error are separately detected and compensated for.

FIG. 4 is a diagram of a color registration sensor disclosed in U.S. Pat. No. 5,241,400. Referring to FIG. 4, charge coupled devices (CCDs) 40a and 40b are provided as color registration sensors. CCD drivers 48 and 49 are provided to drive the CCDs 40a and 40b. A registration adjuster 40 registers signals produced by the CCDs 40a and 40b. A system controller 41 receives a signal from the registration adjuster 40 and controls a system 45. A mode of a signal output from the system controller 41 is converted by a mode switching circuit 42, and is input into a driver 43. The driver 43 drives the system 45 according to the input signal.

The above conventional technique has drawbacks in that a pulse generator and a CCD driver are required to drive the CCDs in order to configure a system for detecting color registration and image density using the CCD, and the configuration of a signal detector is complicated and difficult since the levels of analog signals detected by the CCDs are different.

FIG. 5 is a diagram of an image density sensor disclosed in U.S. Pat. No. 6,115,512. Referring to FIG. 5, a white light source 58 to radiate a beam at marks (not shown) on a transfer belt 50 is provided at the center between light receiving devices 53 and 55. Filters 52 and 54 to selectively receive beams reflected from the marks on the transfer belt 50 according to color are provided on the front sides of the light receiving devices 55 and 53, respectively. The white light source 58 is a light emitting diode (LED). A beam radiated from the white light source 58 should have a wide area in order to sufficiently illuminate the marks. Accordingly, the detection area of each of the light receiving devices 53 and 55 should be wide. Since the spot size of the beam radiated from the LED white light source 58 used in the above conventional technique is large, detection errors in color registration are large, making it difficult to detect color registration.

FIG. 6 is a diagram of an image density sensor disclosed in U.S. Pat. No. 5,303,037. Referring to FIG. 6, a red light source 65 is provided at the center between a blue light source 63 and a green light source 67. An acrylic prism 69 directs the beams output by the blue, red and green light sources 63, 65 and 67 into a focusing lens 64 which focuses the beams onto a mark (not shown) on a transfer belt 62. Since the above-described conventional technique uses the three color light sources 63, 65, and 67 for an image density sensor, the configuration of the sensor is complicated by the need to maintain a constant light output from the light sources 63, 65, and 67, making the sensor expensive.

As described above, conventional image forming apparatuses are provided with separate sensors for color registration and image density. They do not use a sensor performing both functions together. In addition, conventional color registration sensors have complicated configurations and poor performance, so it is difficult to accurately detect color registration error.

SUMMARY OF THE INVENTION

Accordingly, it is an object of the present invention to provide a color registration control apparatus with a simple structure to accurately detect color registration, and a method of calculating color registration error.

It is another object of the present invention to provide an apparatus to control color registration and image density, to thereby simultaneously detect color registration and image density.

Additional objects and advantages of the invention will be set forth in part in the description which follows and, in part, will be obvious from the description, or may be learned by practice of the invention.

The foregoing and other objects of the invention are achieved by providing an apparatus to control color registration in a printer having a transfer belt. The apparatus includes a plurality of registration marks arranged on the transfer belt in a cross-scan direction thereof, parallel to a direction in which the transfer belt moves and perpendicular to a scan direction, each of the registration marks including a scan direction component, and a slanting direction component at an angle with respect to both the scan direction and the cross-scan direction; and a registration sensor provided above the registration marks, to radiate beams onto the registration marks in the scan direction so that the beams are perpendicular to the direction in which the transfer belt moves, and to receive the radiated beams which are reflected from the registration marks to produce detection signals and to obtain registration information from the detection signals.

According to an aspect of the present invention, each of the registration marks has a wedge shape in which the scan direction component is adjacent to the slanting direction component, and the registration marks are arranged at regular intervals in the cross-scan direction. The registration marks may be arranged on opposite sides of an image area symmetrically or in the same pattern.

The scan direction components of registration marks of different colors may be arranged at regular intervals in the cross-scan direction. Behind the last scan direction component, the slanting direction components of the registration marks of different colors may be arranged at regular intervals in the cross-scan direction. The registration marks may be arranged on opposite sides of an image area in the same pattern. The different colors may be cyan, magenta and yellow, or may be cyan, magenta, yellow and black.

According to another aspect of the present invention, the registration marks are of different colors, and the registration sensor includes an optical module including a light emitter to radiate beams onto the registration marks, and a light receiver to receive beams reflected from the registration marks; a light emitter control unit to control the light emitter so that an amount of the beams emitted from the light emitter is constant; a color registration control unit to obtain information to compensate for a color registration error from detection signals produced by the light receiver; and a system control unit to receive the information from the color registration control unit to compensate for the color registration error and to control the color registration control unit and the printer.

The light emitter may include a light source to emit beams, and a converging lens to converge the beams emitted from the light source onto the registration marks. Furthermore, the light source may be a laser diode.

The light receiver may include a photodetector to receive beams and perform photoelectric conversion, and a converging lens to converge the beams reflected from the registration marks onto the photodetector.

According to yet another aspect of the present invention, the light emitter control unit includes an emitted light measurer to detect the amount of light emitted from the light emitter, and a light emitter driver to compare the amount of light detected by the emitted light measurer with a reference amount and to drive the light emitter such that the amount of light emitted from the light emitter is constant.

The color registration control unit may include an amplifier to amplify the detection signals from the light receiver, a mark position detector to detect the positions of the registration marks from signals output from the amplifier, and an offset calculator to calculate offsets from the detected positions of the registration marks.

The amplifier may include a current-to-voltage converter to convert the detection signals produced by the light receiver from current to voltage.

The system control unit may include an offset controller to change output values of the amplifier to compensate for differences in the amount of light of the beams reflected from the color registration marks of different colors, and a printer controller to receive offset information from the offset calculator and control the printer.

The foregoing and other objects of the invention are achieved by providing an apparatus to control color registration and an image density in a printer having a transfer belt and an image density. The apparatus includes a plurality of registration marks arranged on the transfer belt in a cross-scan direction thereof, parallel to a direction in which the transfer belt moves and perpendicular to a scan direction, each of the registration marks including a scan direction component, and a slanting direction component at an angle with respect to both the scan direction and the cross-scan direction; a plurality of image density marks arranged on the transfer belt in the cross-scan direction, each of the image density marks having an image density; and a registration and image density sensor provided above the registration marks and the image density marks, to radiate beams onto the registration marks and the image density marks in the scan direction so that the radiated beams are perpendicular to the direction in which the transfer belt moves, and to receive beams reflected from the registration marks and the image density marks to produce detection signals therefrom and to obtain registration information and image density information from the detection signals.

According to an aspect of the present invention, each of the registration marks has a wedge shape in which the scan direction component is adjacent to the slanting direction component, and the registration marks are arranged at regular intervals in the cross-scan direction. The registration marks may be arranged on opposite sides of an image area symmetrically or in the same pattern.

According to another aspect of the present invention, the scan direction components of the registration marks of different colors are arranged at regular intervals in the cross-scan direction, and behind the last scan direction component the slanting direction components of the registration marks of different colors are arranged at regular intervals in the cross-scan direction, and the registration marks are arranged on opposite sides of an image area in the same pattern. The different colors may be cyan, magenta and yellow or may be cyan, magenta, yellow and black.

According to yet another aspect of the present invention, the registration and image density marks are of different colors and the registration and image density sensor includes an optical module including a light emitter to radiate beams onto the registration marks and the image density marks, and a light receiver to receive beams reflected from the registration marks and the image density marks; a light emitter control unit to control the light emitter so that an amount of the beams emitted from the light emitter is constant; a color registration control unit to obtain information to compensate for a color registration error from detection signals produced by the light receiver; an image density control unit to obtain information to compensate for an image density error from the detection signals produced by the light receiver; and a system control unit to receive the information from the color registration control unit to compensate for the color registration error and the information from the color registration control unit to compensate for the image density error and to control the color registration control unit, the image density control unit, and the printer.

The light emitter may include a light source to emit light beams; and a converging lens to converge the beams emitted from the light source onto the registration marks or the image density marks. The light source may be a laser diode.

The light receiver may include a photodetector to receive the beams and perform photoelectric conversion, and a converging lens to converge the beams reflected from the registration marks onto the photodetector or the image density marks.

The light emitter control unit may include an emitted light measurer to detect the amount of light emitted from the light emitter, and a light emitter driver to compare the amount of light detected by the emitted light measurer with a reference amount and drive the light emitter such that the amount of light emitted from the light emitter is maintained constant.

The color registration control unit may include an amplifier to amplify the detection signals from the light receiver, a mark position detector to detect the positions of the registration marks from signals output from the amplifier, and an offset calculator to calculate offsets from the detected positions of the registration marks.

The image density control unit may include an amplifier to amplify the detection signals produced by the light receiver, an image density detector to detect attributes of image density for different colors from signals received from the amplifier, and a deviation calculator to compare the detected attributes with reference attributes and to calculate the deviation therebetween.

The amplifier may include a current-to-voltage converter to convert the detection signals produced by the light receiver from current to voltage.

According to yet another aspect of the present invention, the system control unit includes an offset controller to change output values of the amplifier to compensate for differences in an amount of light of the beams reflected from the color registration marks or the image density marks of different colors, and a printer controller to receive offset information from the offset calculator and the deviation from the deviation calculator, and to control the printer.

The foregoing and other objects of the present invention are also achieved by providing a method of calculating color registration error in an apparatus including a transfer belt. The method includes forming the registration marks on the transfer belt in a cross-scan direction perpendicular to a scan direction, each of the registration marks including a scan direction component and a slanting direction component at an angle with respect to both the scan direction and the cross-scan direction; radiating beams onto one of the registration marks on the transfer belt; and receiving beams reflected from the radiated registration mark to produce a detection signal; and calculating a color registration error based on the detection signal.

The forming of the registration marks may include forming each of the registration marks to have a different color and to have a wedge shape in which the scan direction component is adjacent to the slanting direction component.

The forming of the registration marks includes forming the registration marks to have different colors; and forming the registration marks such that the scan direction components and the slanting direction components are arranged at regular intervals in the cross-scan direction.

The receiving of the beams may include calculating an offset error in the cross-scan direction from a difference between a predetermined interval between the scan direction components of two registration marks of different colors among the color registration marks arranged on a same side of the transfer belt, and a detected interval therebetween.

The forming of the registration marks may include forming the registration marks on opposite sides of an image area of the transfer belt in a same pattern or a symmetrical pattern.

The forming of the registration marks may include forming the registration marks on opposite sides of an image area of the transfer belt in a same pattern.

The receiving of the beams may include calculating an offset error in the scan direction from a difference between a detected interval between the scan direction component of a first one of the registration marks and the slanting direction component thereof, and a detected interval between the scan direction component of a second one of the registration marks and the slanting direction component thereof, wherein the first and second registration marks are positioned on the same side of the transfer belt.

The receiving of the beams may include calculating a printing width error from a difference between a detected interval between the scan direction component of a first one of the registration marks and the slanting direction component thereof, and a detected interval between the scan direction component of a second one of the registration marks and the slanting direction component thereof, wherein the first and second registration marks are positioned at opposite sides of the transfer belt, the first and second marks having a same color.

The receiving of the beams may include calculating a skew from a difference between a detected interval between the scan direction components of two different colored registration marks positioned on a first side of the transfer belt, and a detected interval between the scan direction components of two different colored registration marks positioned on a second of the transfer belt, wherein the two different colored registration marks on the first side have the same colors, respectively, as the two different colored registration marks on the second side.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
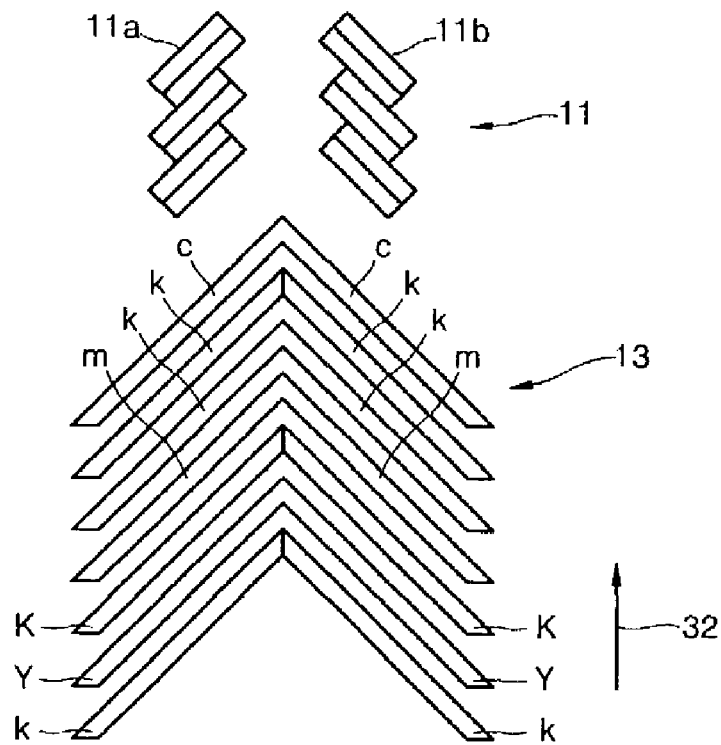
FIG. 1 is a diagram of a conventional color registration sensor and mark pattern.
Figure 2:
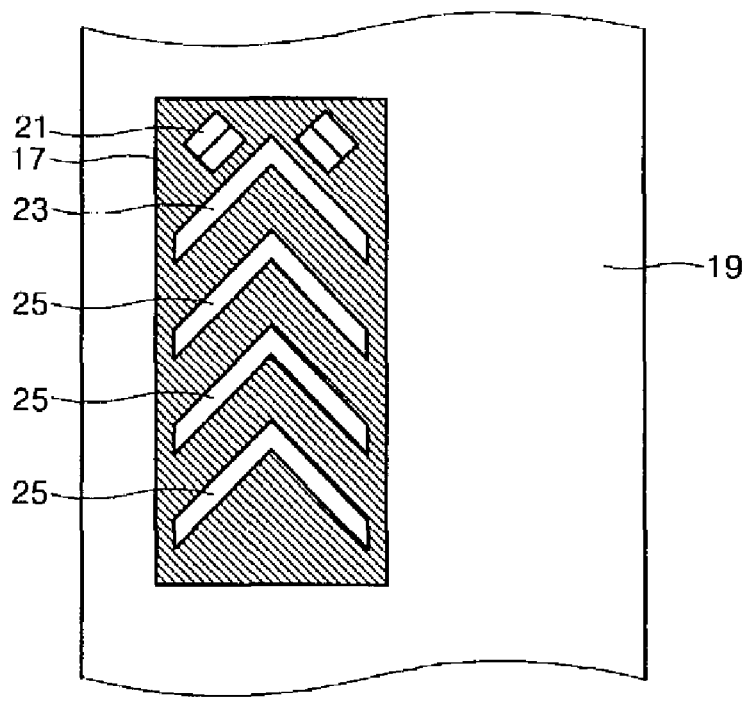
FIG. 2 is a diagram of another conventional color registration sensor and mark pattern.
Figure 3:
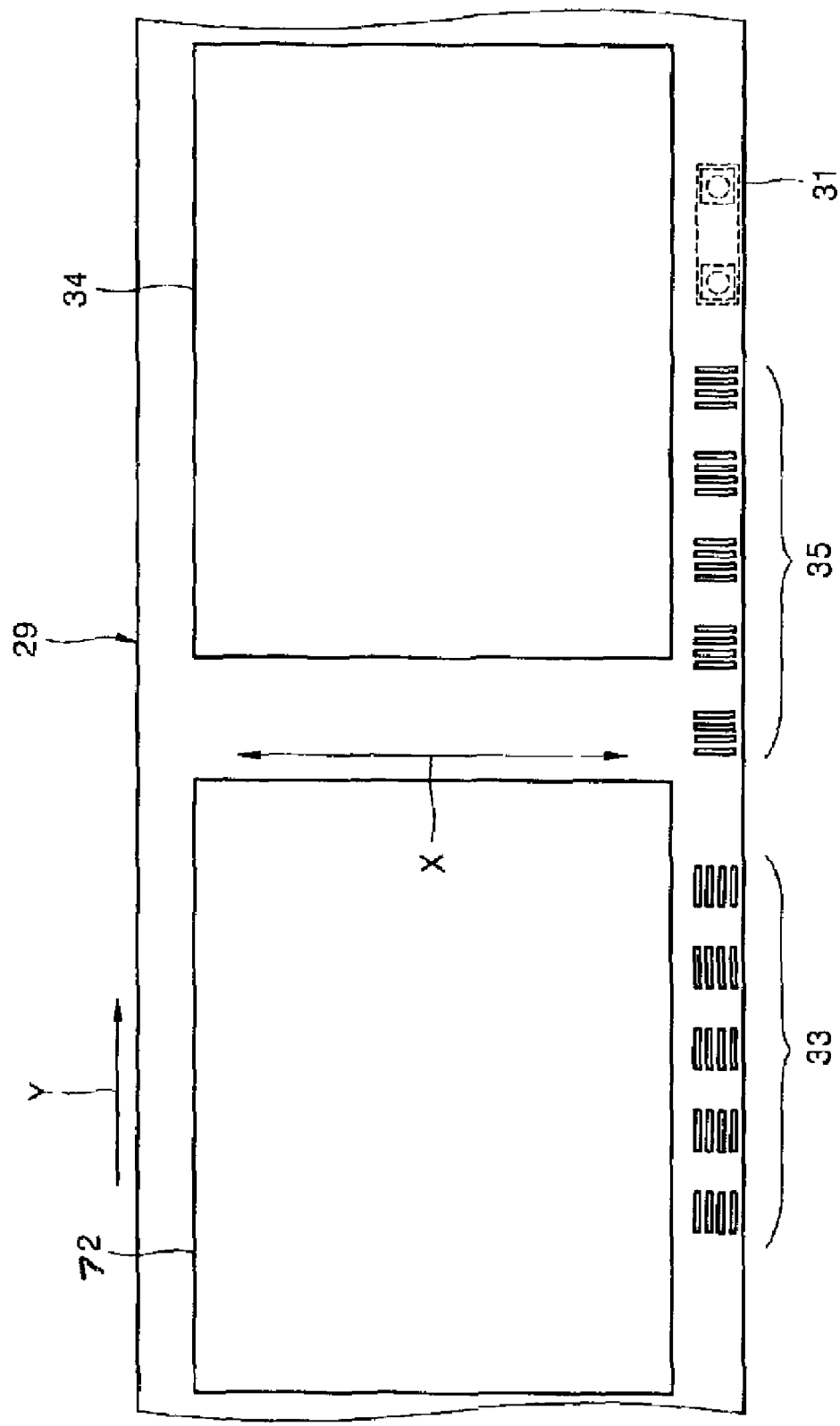
FIG. 3 is a diagram of yet another conventional color registration sensor and mark pattern.
Figure 4:
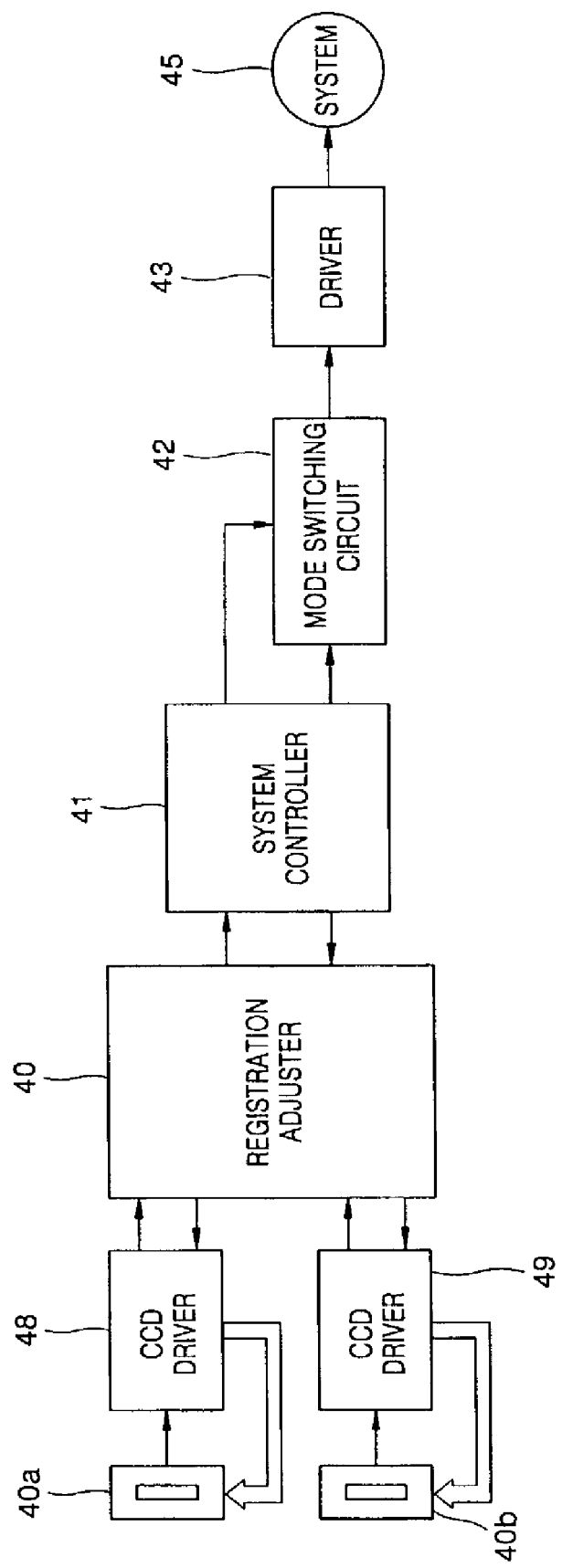
FIG. 4 is a diagram of still another conventional color registration sensor and mark pattern.
Figure 5:
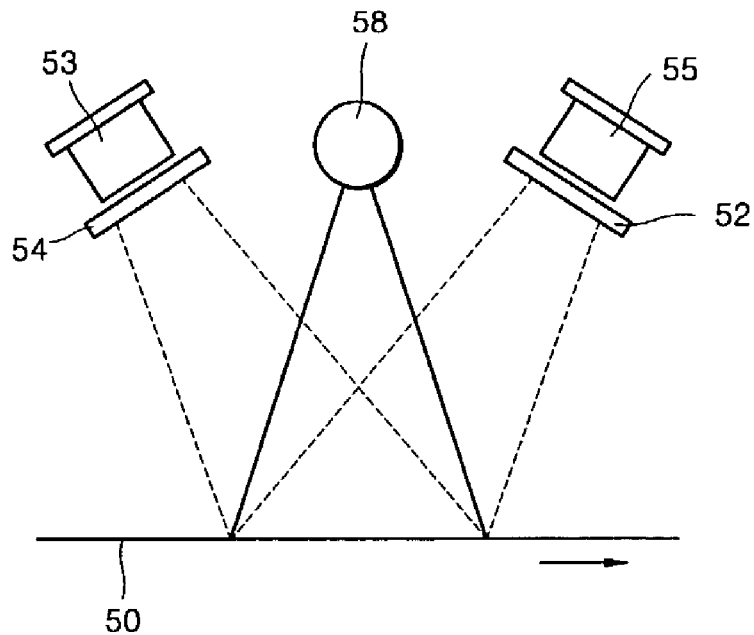
FIG. 5 is a diagram of a conventional image density sensor.
Figure 6:
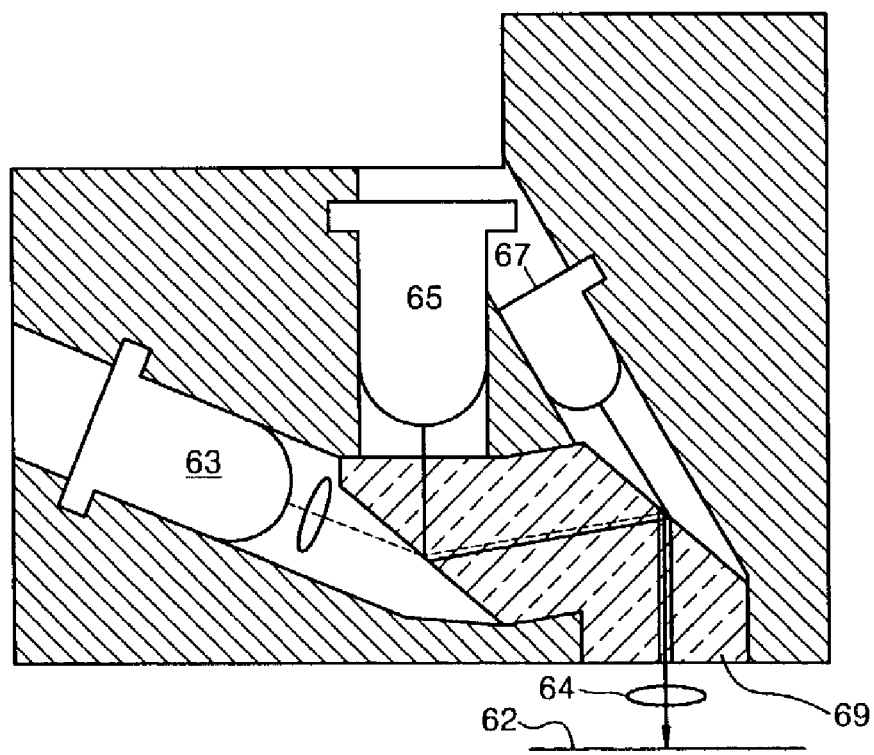
FIG. 6 is a diagram of another conventional image density sensor.

Reference will now be made in detail to the present preferred embodiments of the present invention, examples of which are illustrated in the accompanying drawings, wherein like reference numerals refer to like elements throughout.

The present invention provides a color registration control apparatus to accurately detect registration marks to perform registration on different color images, an apparatus to control color registration and image density which can simultaneously detect color registration and image density, and a method of calculating scan direction, cross-scan direction, printing width, and skew registration errors according to color.

Hereinafter, a color registration control apparatus according to the present invention will be described in detail with reference to the attached drawings.

Figure 7:
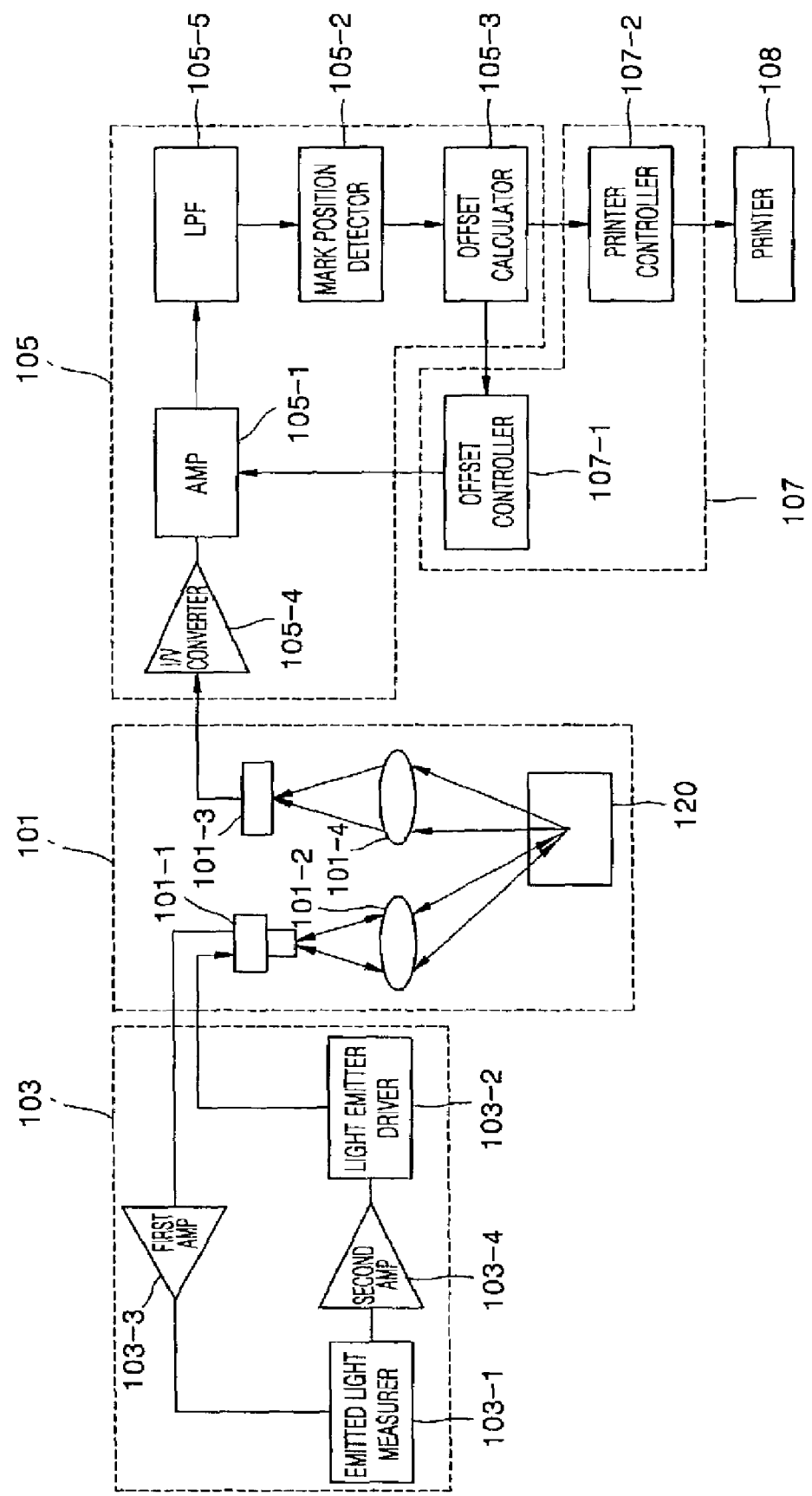
FIG. 7 is a block diagram of a color registration control apparatus according to a first embodiment of the present invention.

FIG. 7 is a block diagram of a color registration control apparatus according to an embodiment of the present invention. Referring to FIG. 7, the color registration control apparatus includes a registration mark 120, and a color registration sensor including an optical module 101, a light emitter control unit 103, a color registration control unit 105, and a system control unit 107.

The registration mark 120 includes a scan direction component, and a slanting direction component at an angle to the scan and cross-scan directions.

The optical module 101 includes a light emitter to radiate light beams onto the registration mark 120, and a light receiver to receive beams reflected from the registration mark 120. The light emitter includes a light source 101-1 to generate and emit the light beams, and a focusing lens 101-2 to focus the beams emitted from the light source 101-1 onto the registration mark 120. A laser diode is used as the light source 101-1. The light receiver includes a photodetector 101-3 to receive the beams and perform photoelectric conversion of the received beams, and a focusing lens 101-4 to focus the beams emitted from the light emitter and reflected from the registration mark 120 onto the photodetector 101-3.

The light emitter control unit 103 detects the amount of light emitted from the light emitter and controls the light emitter to maintain a constant emission. The light emitter control unit 103 includes a first amplifier (AMP) 103-3 to amplify a signal representing an amount of the light emitted from the light source 101-1, an emitted light measurer 103-1 to receive an output signal of the first AMP 103-3 and to measure the amount of the light emitted from the light emitter, a second AMP 103-4 to amplify an emitted light amount signal output from the emitted light measurer 103-1, and a light emitter driver 103-2 to compare the output signal of the second AMP 103-4 with a reference emitted light amount signal, and to output the reference emitted light amount signal to the light emitter to control the amount of the emitted light.

A current signal produced by the light receiver is transmitted to the color registration control unit 105. The color registration control unit 105 obtains information to compensate for color registration errors from the current signal produced by the light receiver. Here, the information to compensate for color registration errors refers to offset in the scan direction, offset in the cross-scan direction, error in printing width, and skew.

The color registration control unit 105 includes a current-to-voltage (I/V) converter 105-4 to convert the current signal produced by the light receiver into a voltage signal, an AMP 105-1 to amplify the voltage signal from the I/V converter 105-4, a low-pass filter (LPF) 105-5 to pass only a low frequency band of the amplified signal, a mark position detector 105-2 to detect the position of the registration mark 120 from a signal received from the LPF 105-5, and an offset calculator 105-3 to calculate an offset from the value of the detected mark position. Here, the offset includes information about an X-offset in the scan direction, a Y-offset in the cross-scan direction, error in printing width, and skew.

The system control unit 107 includes a printer controller 107-2 to receive information to compensate for a color registration error and to control a printer 108, and an offset controller 107-1 to change the output value of the AMP 105-1 to compensate for a difference in the amount of light of beams reflected from a pair of the registration marks 120 of the same color.

Figure 8:
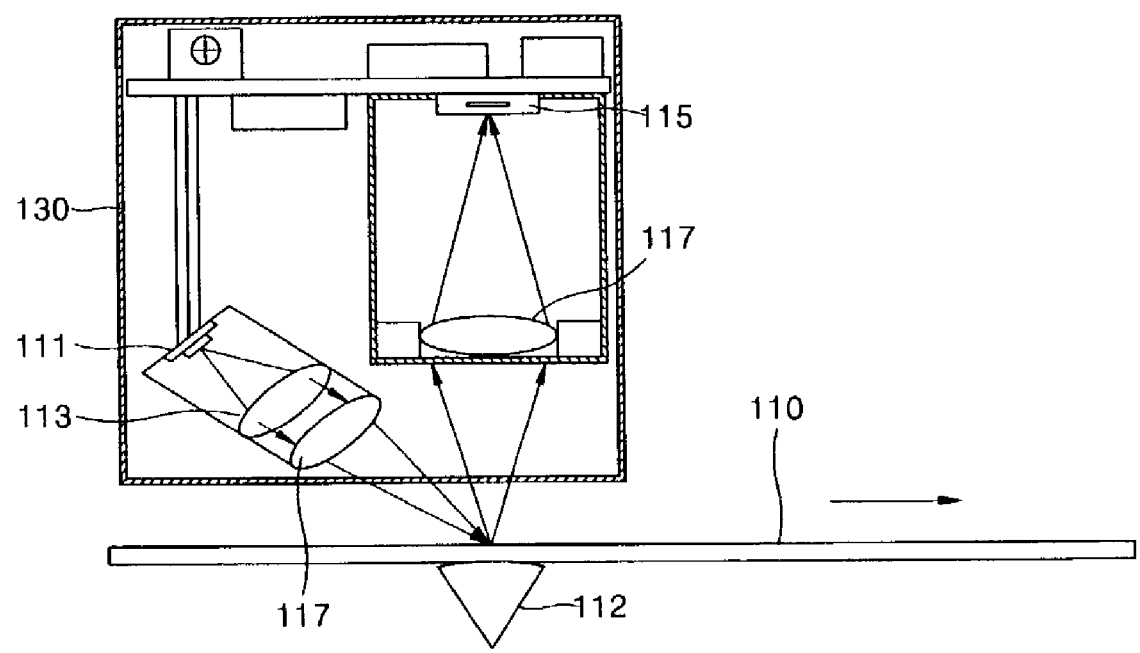
FIG. 8 is a sectional view of the optical module configuration of a color registration sensor according to the first embodiment of the present invention.

FIG. 8 is a sectional view of the optical module configuration of a color registration sensor used in a color registration control apparatus according to the embodiment of the present invention of FIG. 7. Referring to FIG. 8, an optical module 130 is provided with a light emitter including a laser diode 111 as a light source and a focusing lens 117 to focus beams emitted from the laser diode 111 onto a registration mark 120 (see FIG. 10) on a transfer belt 110. A collimating lens 113 to convert beams emitted from the laser diode 111 into parallel beams is further provided on the optical path between the laser diode 111 and the focusing lens 117.

Figure 10:
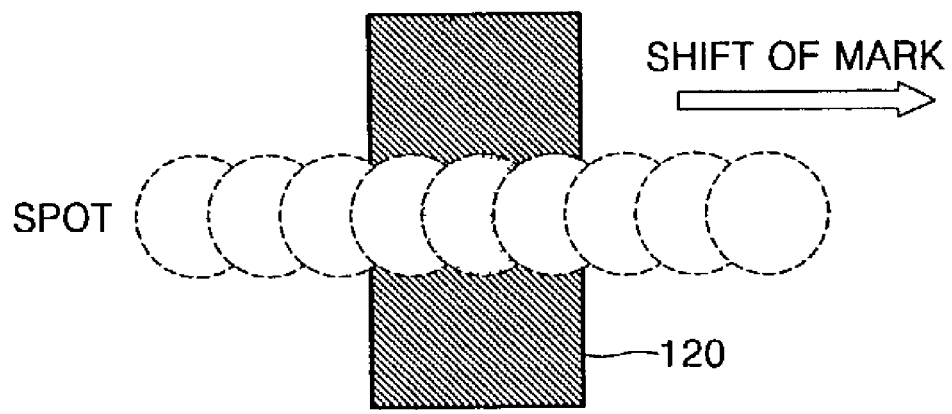
FIG. 10 is a diagram of a beam radiated from the color registration sensor according to the present invention.

Referring to FIG. 10, a spot size of a beam radiated onto the registration mark 120 is no greater than about 200 μm. If the size of the spot is decreased to 100 μm or less, detection performance can be improved. The sensor can be made more reliable if the beam is reflected only at a position where it meets the registration mark 120. In addition, errors caused by chromatic aberration can be reduced if the emitted beam has a single wavelength.

The optical module 130 further includes a light receiver including a photodetector 115 to receive beams reflected from the registration mark 120 and perform photoelectric conversion, and a focusing lens 117 provided between the registration mark 120 and the photodetector 115 to focus beams reflected from the registration mark 120 onto the photodetector 115.

Referring to FIG. 10, when the registration mark 120 shifts, the spot of the beam emitted from the light source shifts, as shown in the drawing. When the spot of the emitted beam is at the center of the registration mark 120, a maximum detection signal can be obtained. For optimum performance, the light receiver is designed to receive only beams diffusely reflected, rather than beams regularly reflected at an angle equal to the angle of incidence, thereby reducing detection error.

Figure 9:
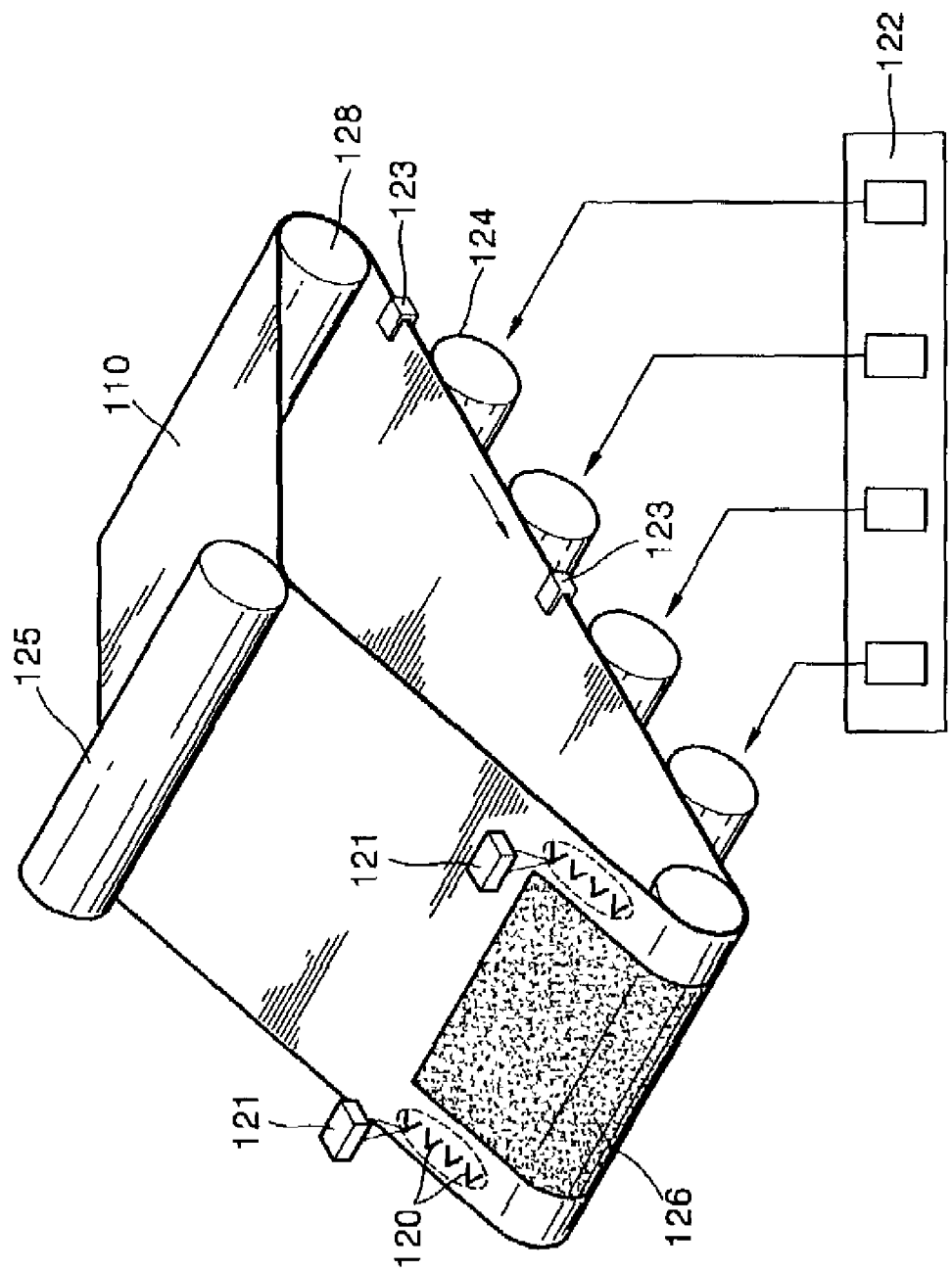
FIG. 9 is a schematic perspective view of a printer in which a color registration control apparatus according to the first embodiment of the present invention is installed.

FIG. 9 is a schematic perspective view of a printer in which a color registration control apparatus according to the embodiment of the present invention is installed. Referring to FIG. 9, patterns of the registration marks 120 are formed on the left and right sides of an image area 126 of the transfer belt 110. Color registration sensors 121 are provided above the registration marks 120.

Here, reference numeral 122 denotes a laser scanning unit (LSU), reference numeral 123 denotes a belt position sensor, reference numeral 124 denotes an organic photoconductive cell (OPC) drum, reference numeral 125 denotes a transfer roller, and reference numeral 128 denotes a transfer belt drive roller.

Color registration errors may have various causes in an LSU and a belt drive mechanism, and during belt steering and the assembly process. A belt steering error arises from belt weaving or deformation of the belt unit. An error during the assembly process may arise during the assembly of the OPC drums 124, and the assembly of the LSUs 122.

An error in the LSU arises from irregular laser scan speed, asynchronization of a polygon mirror (not shown), jitter in an LSU motor (not shown), nonparallel laser beams, and mismatch in bow between laser beams. Here, asynchronization of a polygon mirror may be caused by inaccurate manufacture or imbalance during horizontal rotation, and causes an error in a scanning line. When laser beams are not parallel due to misalignment or mismatch in laser beam bow, toners are developed in the form of a bow, so an error may occur.

An error which may occur in a belt and OPC drum drive mechanism (not shown) arises from a change in the diameter of a roll due to temperature, a change in the linear velocity of the transfer belt 110 due to load on the belt, a change in rotary speed due to load on the OPC drum 124, and irregular driving of a transfer belt drive roller 128.

Figure 11:
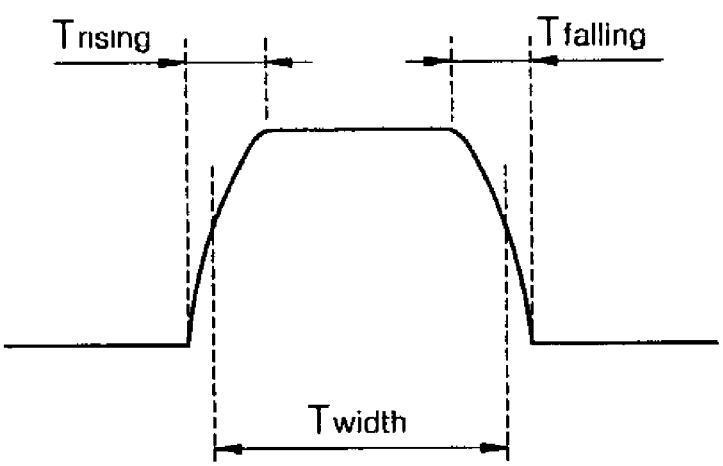
FIG. 11 is a schematic diagram of the scattered waveform of a beam which is detected by the color registration sensor according to the present invention.

FIG. 11 is a diagram of a waveform of a beam detected by a photodetector. FIG. 11 is provided to explain a method of detecting the position of a color registration mark. Referring to FIGS. 10 and 11, it can be seen from the waveform of a detection signal of beams reflected from a registration mark 120 that the power of the detection signal output from a registration sensor (not shown in FIGS. 10 and 11) rises as the registration mark 120 on the transfer belt (not shown in FIGS. 10 and 11) approaches the registration sensor, remains constant as the registration mark 120 passes the center of the registration sensor, and gradually falls as the registration mark 120 moves away from the registration sensor.

The time taken for the power to rise from the minimum to the maximum value is represented by $T_{rising}$, and the time taken for the power to fall from the maximum value to the minimum value is represented by $T_{falling}$. Times $T_{rising}$ and $T_{falling}$ depend on the spot size of the beam. As the spot size of the beam is smaller, times $T_{rising}$ and $T_{falling}$ decrease, so that a mark detection error decreases.

Here, the position W of the mark 120 is determined by Formula (1). $T_{width}$ indicates the time between the middle of the time $T_{rising}$ and the middle of the time $T_{falling}$.

$$W = T_{width}/2 \qquad (1)$$

Figure 12:
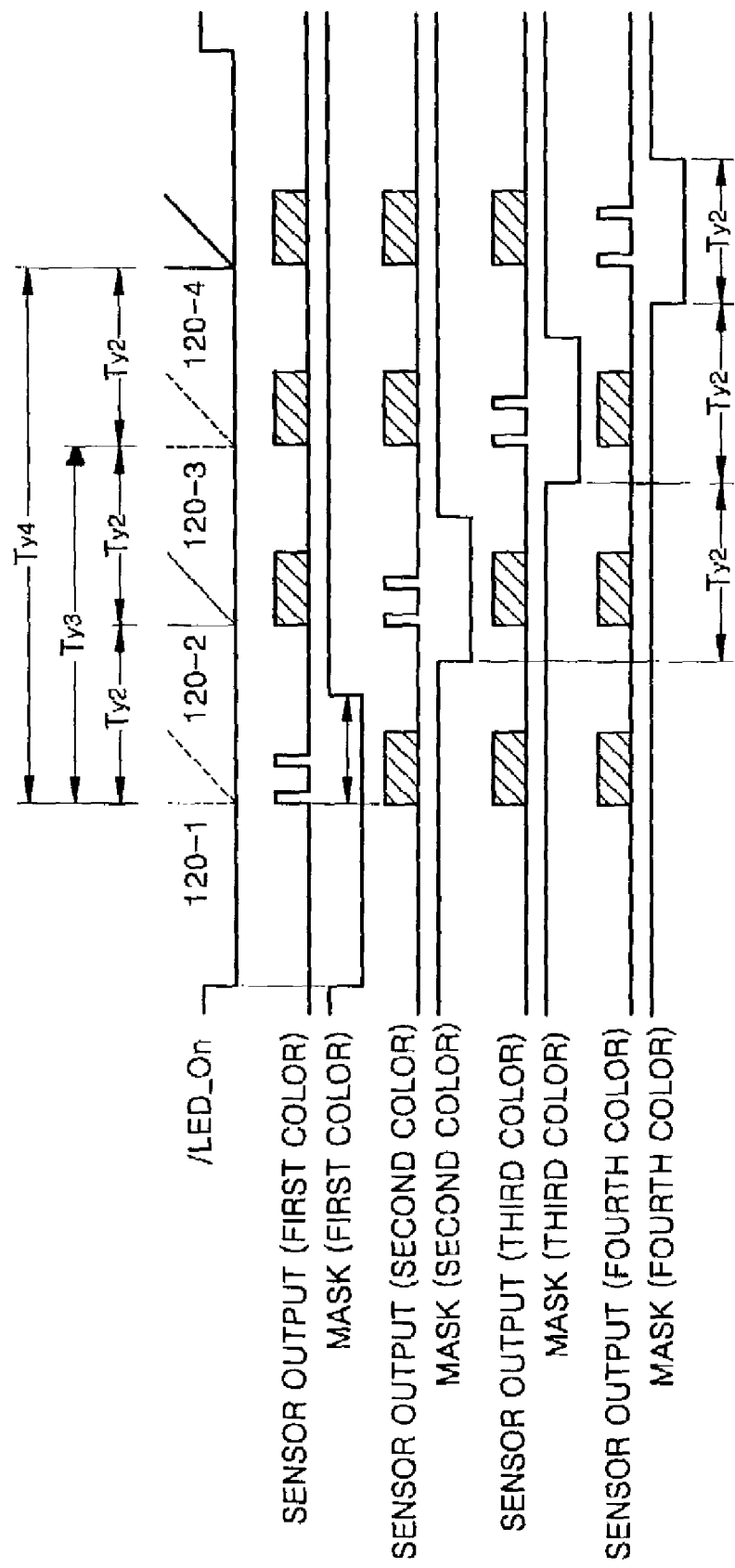
FIG. 12 is a diagram of signals according to color produced by the color registration sensor according to a first arrangement of registration marks of the present invention.

FIG. 12 is a diagram of signals produced with respect to registration marks of different colors and masked by a color registration sensor according to the embodiment of the present invention. Referring to FIG. 12, it can be seen from a graph of a first detection signal that the first detection signal output from the color registration sensor includes a scan direction signal component and a slanting direction signal component at the position of a first color registration mark 120-1. Masking is performed to prevent signals of second through fourth color registration marks 120-2, 120-3, and 120-4 from being produced. The graphs of second through fourth detection signals of the second through fourth color registration marks 120-2, 120-3, and 120-4 can be explained in the same manner as the graph of the first detection signal.

Here, $T_{y2}$ indicates the time interval between the scan direction component of the first color registration mark 120-1 and the scan direction component of the second color registration mark 120-2. $T_{y3}$ indicates the time interval between the scan direction component of the first color registration mark 120-1 and the scan direction component of the third color registration mark 120-3. $T_{y4}$ indicates the time interval between the scan direction component of the first color registration mark 120-1 and the scan direction component of the fourth color registration mark 120-4.

Figure 13:
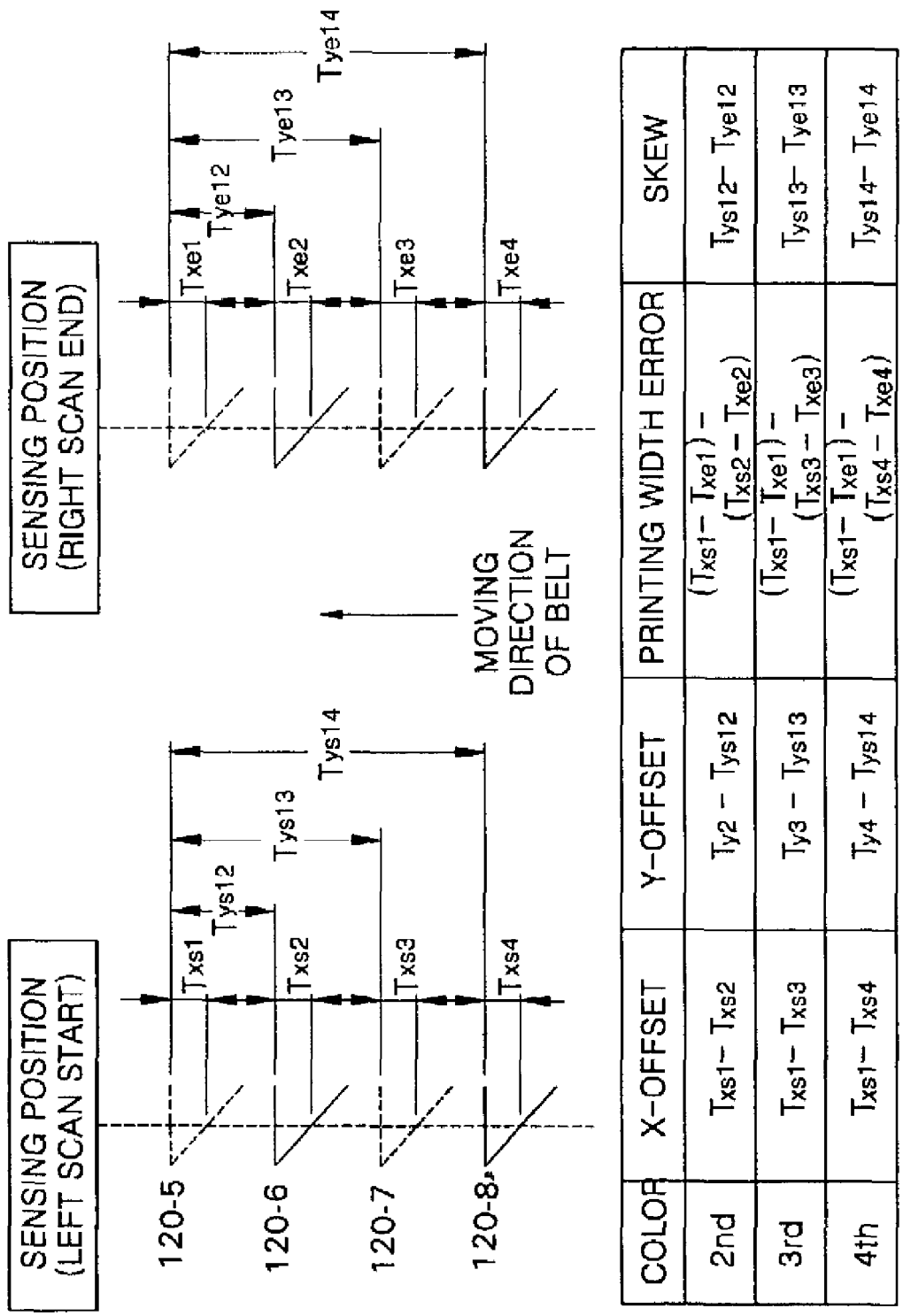
FIG. 13 shows offsets calculated by the color registration sensor according to the first arrangement of registration marks of the present invention.

FIG. 13 illustrates a method of calculating color registration error and image density. The method uses an apparatus which includes registration marks and image density marks arranged in a cross-scan direction parallel to the moving direction of a transfer belt of a printer. A registration sensor and an image density sensor provided above the registration marks and the image density marks, respectively, radiate beams in a scan direction perpendicular to the moving direction of the transfer belt. The method of calculating color registration errors includes (1) forming the registration marks, each having a scan direction component and a slanting direction component at an angle with respect to the scan direction and the cross-scan direction; (2) radiating beams onto the registration marks on the transfer belt, and (3) calculating color registration errors using signals produced from beams reflected from the registration marks.

In operation (1), each registration mark is formed such that the scan direction component and the slanting direction component are adjacent, to form the shape of a wedge, and the scan direction components and the slanting direction components of the registration marks of different colors are alternately arranged at opposite sides of an image area at regular intervals in the cross-scan direction. The scan and slanting direction components of the registration marks of the different colors may be arranged symmetrically about a center of the transfer belt or asymmetrically to form a same pattern on each side. Alternatively, in operation (1), the scan direction components of the registration marks of the different colors may be arranged at the opposite sides of the image area at regular intervals, and then behind the last scan direction component the slanting direction components of the registration marks of the different colors are arranged at regular intervals so that the registration marks at the opposite sides of the image area are formed asymmetrically in the same pattern.

First through fourth color registration mark pairs 120-5 through 120-8 formed on the left and right sides of a transfer belt (not shown in FIG. 13) are shown in the upper portion of FIG. 13, and methods of calculating X-offsets, Y-offsets, printing width errors, and skew with respect to the second through fourth color registration mark pairs 120-5 through 120-8 are shown in the lower portion of FIG. 13.

X-offset, that is, scan direction error, with respect to color registration marks can be obtained from the differences between time intervals between the scan direction components and the slanting direction components of the respective color registration marks.

An X-offset with respect to the second color registration mark on the left side is expressed by Formula (2). Here, $T_{xs1}$ indicates the time interval between the scan direction component of the first color registration mark on the left side and the slanting component thereof, and $T_{xs2}$, $T_{xs3}$, and $T_{xs4}$ indicate the same time interval with respect to the second, third and fourth color registration marks, respectively, on the left side.

$$T_{xs1} - T_{xs2} \qquad (2)$$

When Formula (2) gives a negative result, $T_{xs2}$ is greater than $T_{xs1}$, which means that the second color registration mark on the left side is positioned further to the left than the first color registration mark on the left side. In this case, scan direction error can be reduced by increasing the X-offset. When Formula (2) gives a positive result, $T_{xs2}$ is less than $T_{xs1}$, which means that the second color registration mark on the left side is positioned further to the right than the first color registration mark on the left side. In this case, scan direction error can be reduced by decreasing the X-offset.

X-offsets of the third and fourth color registration marks on the left can be described in the same manner. The X-offset of the third color registration mark on the left is expressed by Formula (3), and the X-offset of the fourth color registration mark on the left is expressed by Formula (4).

$$T_{xs1} - T_{xs3} \qquad (3)$$

$$T_{xs1} - T_{xs4} \qquad (4)$$

The same principles can be applied to the second through fourth registration marks on the right.

Y-offset, that is, cross-scan direction error, of color registration marks are calculated from the difference between predetermined time intervals between the scan direction components of the respective color registration marks of different colors arranged in a cross-scan direction and detected time intervals therebetween.

A Y-offset of the second color registration mark on the left is the difference between $T_{y2}$ (shown in FIG. 12) and $T_{ys12}$ (shown in FIG. 13), and is expressed by Formula (5). Here, $T_{ys12}$ indicates a detected time interval between the scan direction component of the first color registration mark on the left and the scan direction component of the second color registration mark on the left. $T_{ys12}$ is a predetermined value, but $T_{ys12}$ is a variable.

$$T_{y2} - T_{ys12} \qquad (5)$$

When the Y-offset is negative, $T_{ys12}$ is greater than $T_{ys2}$, that is, the detected time interval is longer than the predetermined time interval. This means that a page is delayed. Accordingly, cross-scan direction error can be reduced by advancing the page. When the Y-offset is positive, it can be inferred that a page is advanced based on the above principle. Accordingly, cross-scan direction error can be reduced by delaying the page.

Y-offset of the third and fourth color registration marks on the left can be described based on the same principles as described above. The Y-offset of the third registration mark on the left is expressed by Formula (6), and the Y-offset of the fourth registration mark on the left is expressed by Formula (7).

$$T_{y3}-T_{ys13} \quad (6)$$

$$T_{y4}-T_{ys14} \quad (7)$$

The same principles can be applied to the second through fourth registration marks on the right.

Printing width error can be obtained from the difference between a first differential value and a second differential value. Each of the first and second differential values is the difference between the time interval between the scan direction component and the slanting direction component of a color registration mark on the left, and the time interval between the scan direction component and the slanting direction component of a color registration mark of the same color on the right.

A printing width error of the second color registration mark pair 120-6 is expressed by Formula (8).

$$(T_{xs1}-T_{xe1})-(T_{xs2}-T_{xe2}) \quad (8)$$

When Formula (8) gives a negative result, the printing width between the second left and right registration marks is greater than the printing width between the first left and right registration marks. In this case, reduction of the printing width is required. When Formula (8) gives a positive result, the opposite is true. The same principles as described above can be applied to printing width errors of the third and fourth left and right color registration marks. Here, $T_{xe1}$ indicates the detected time interval between the scan direction component and the slanting direction component of the first color registration mark on the right, and $T_{xe2}$, $T_{xe3}$, and $T_{xe4}$ indicate the same time intervals with respect to the second through fourth color registration marks on the right.

Printing width error of the third left and right color registration marks is expressed by Formula (9), and printing width error of the fourth left and right color registration marks is expressed by Formula (10).

$$(T_{xs1}-T_{xe1})-(T_{xs3}-T_{xe3}) \quad (9)$$

$$(T_{xs1}-T_{xe1})-(T_{xs4}-T_{xe4}) \quad (10)$$

Skew can be obtained from the difference between a detected time interval between the scan direction components of two different color registration marks arranged in a cross-scan direction on the left, and a detected time interval between the scan direction components of corresponding two different color registration marks arranged in a cross-scan direction on the right.

Skew with respect to the second left and right color registration marks is expressed by Formula (11). Even when the above three kinds of errors do not arise, an error in a polygon mirror in an LSU (not shown in FIG. 13) or a laser scan error may cause a scanning line to skew.

$$T_{ys12}-T_{ye12} \quad (11)$$

When Formula (11) gives a negative result, $T_{ye12}$ is greater than $T_{ys12}$, representing skew to the right. When Formula (11) gives a positive result, skew is to the left. Here, $T_{ys12}$ indicates the time interval between the scan direction components of the first and second color registration marks on the left, $T_{ye12}$ indicates the time interval between the scan direction components of the first and second color registration marks on the right, $T_{ys13}$ indicates the time interval between the scan direction components of the first and third color registration marks on the left, $T_{ye13}$ indicates the time interval between the scan direction components of the first and third color registration marks on the right, $T_{ys14}$ indicates the time interval between the scan direction components of the first and fourth color registration marks on the left, and $T_{ye14}$ indicates the time interval between the scan direction components of the first and fourth color registration marks on the right. Skew with respect to the third and fourth color registration mark pairs 120-7 and 120-8 is expressed by Formula (12) and Formula (13), respectively.

$$T_{ys13}-T_{ye13} \quad (12)$$

$$T_{ys14}-T_{ye14} \quad (13)$$

The above methods of calculating X-offset, Y-offset, printing width error and skew can be applied to a method of controlling a printer having registration marks for different colors, which each includes only a scan direction component and they are arranged on the left and right sides of a transfer belt in a cross-scan direction.

In a method of controlling a printer having registration marks for different colors, which are arranged only on one side of a transfer belt in a cross-scan direction, the above method of calculating Y offset can be used.

A registration mark can include a scan direction component and a slanting direction component in a wedge shape, and a plurality of the registration marks can be arranged in the same pattern or in a symmetrical pattern.

Figure 19:
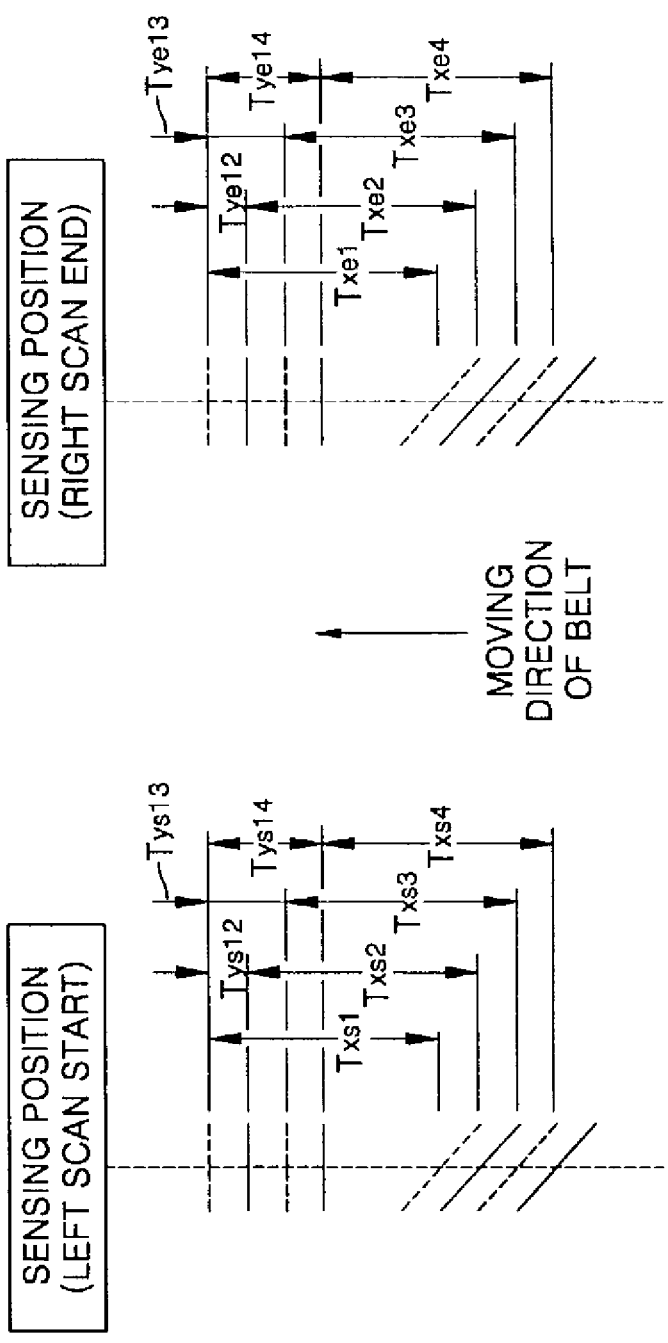
FIG. 19 shows offsets calculated by the color registration and image density sensor according to the second arrangement of registration marks, of the present invention.

As shown in FIG. 19, a mark pattern, in which scan direction components for first through fourth colors are arranged at regular intervals and slanting direction components for the first through fourth colors are arranged at regular intervals behind the scan direction component for the fourth color, can be formed in the same manner on each of the left and right sides.

Figure 14A:
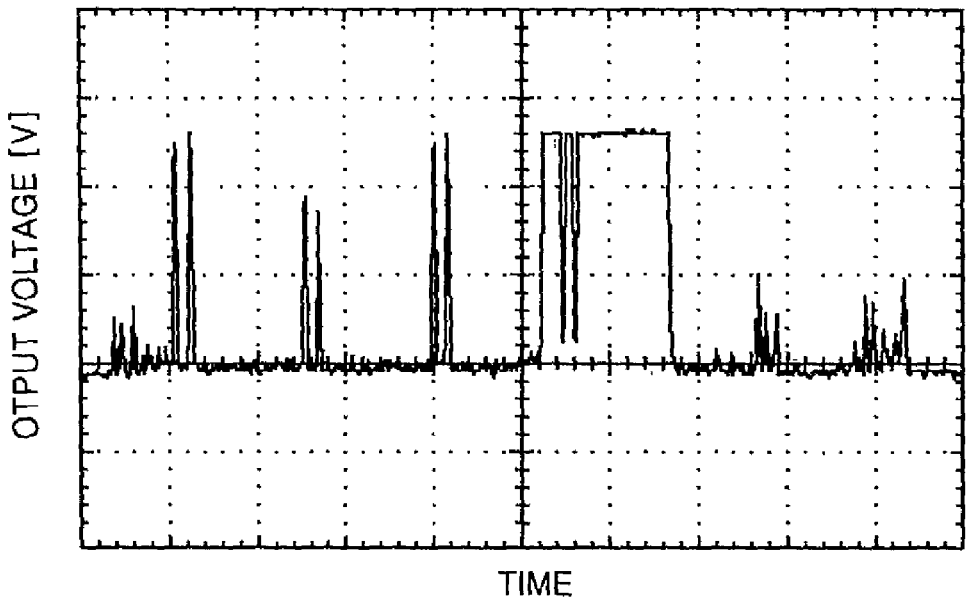
FIGS. 14A through 14C show X-offsets calculated by the color registration sensor according to the present invention.
Figure 14B:
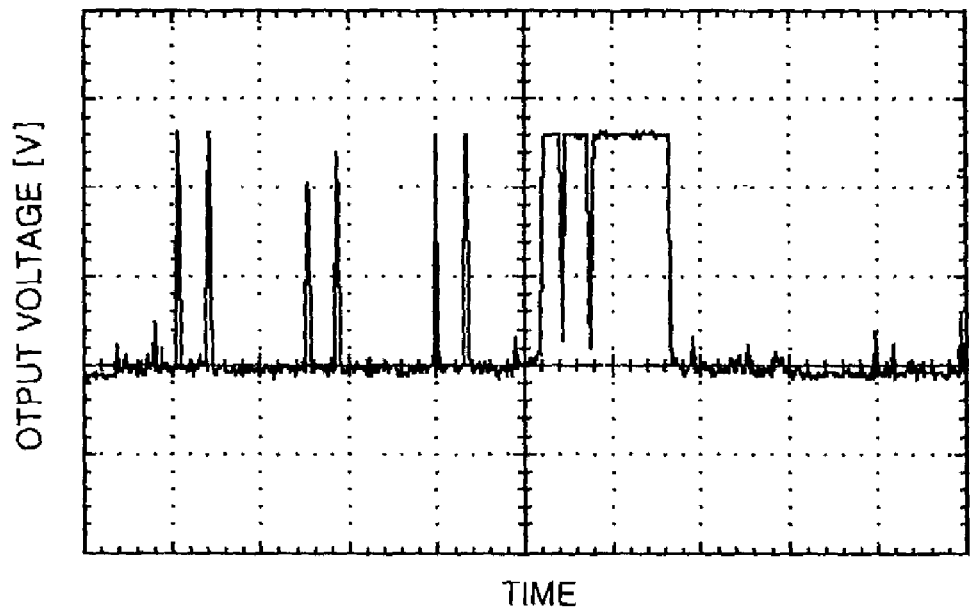
Figure 14C:
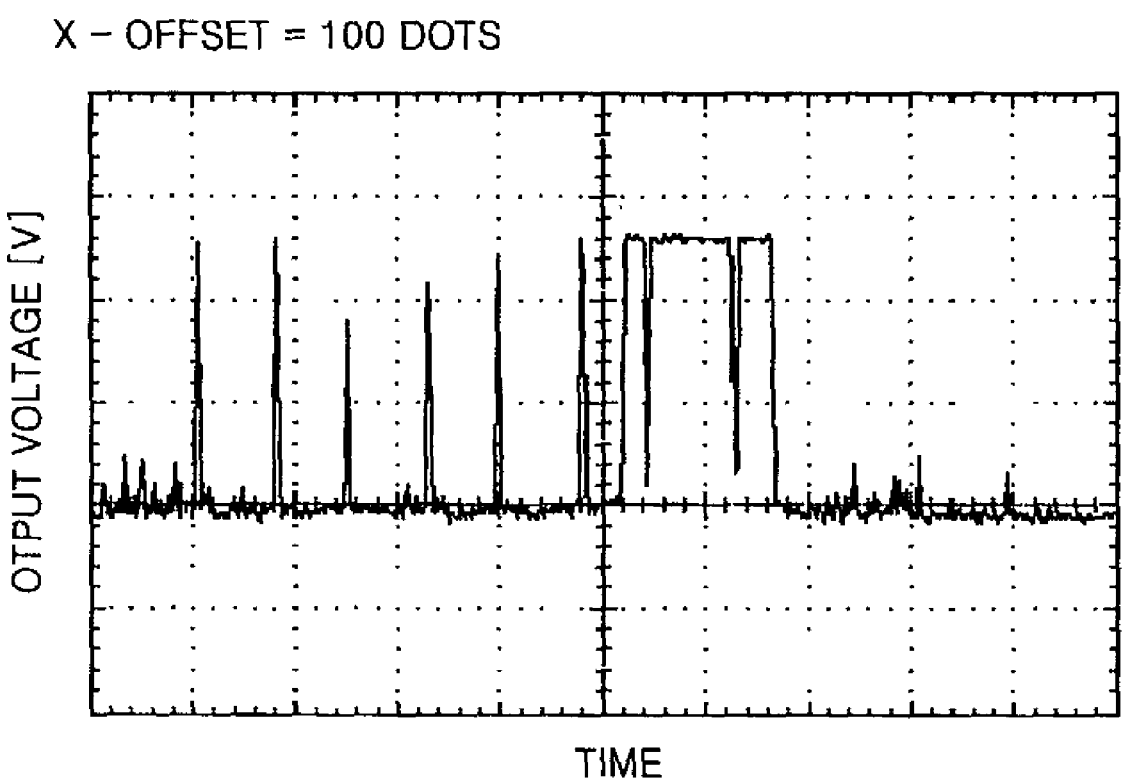

FIGS. 14A through 14C show signals produced when the X-offset is 10 dots, when the X-offset is 50 dots, and when the X-offset is 100 dots, respectively. Referring to FIGS. 14A through 14C, since each of first through fourth color registration marks includes a scan direction component and a slanting direction component, two adjacent points at which the output voltage suddenly rises form a pair. In the case where the fourth color is black, a fourth color registration mark is formed by developing a color other than black and forming a color registration mark on the developed color in a wedge shape. Since a beam is absorbed by the black fourth color registration mark, the signal falls at the point where the fourth color registration mark is detected.

It can be seen that as the X-offset increases from 10 dots to 50 dots to 100 dots, the interval between the time when the scan direction component of a color registration mark is detected and the time when the slanting direction component thereof is detected gets greater. In other words, the degree of X-offset can be estimated by measuring the time interval between adjacent rising points in an offset detection signal. Accordingly, information used to control a printer can be obtained.

In the above-described apparatus and method to detect registration marks, since the spot size is reduced so that a beam can be reflected from only a registration mark, probability and reliability of detection of the registration mark can be increased. Since only diffusely reflected components are detected, detection error can be reduced. In addition, radiation of a beam having a single wavelength can remove chromatic aberration. Since color registration sensors are provided on the left and right sides, the above four kinds of errors can be simultaneously detected.

However, since the above color registration sensor is for color registration, a separate sensor to detect an image density is required. Accordingly, in addition to a color registration sensor and a method of calculating a color registration error, the present invention also provides a sensor to simultaneously detect color registration and image density and a method of calculating color registration error and image density error using the sensor.

Hereinafter, a color registration and image density sensor according to the present invention will be described in detail with reference to the attached drawings.

Figure 15:
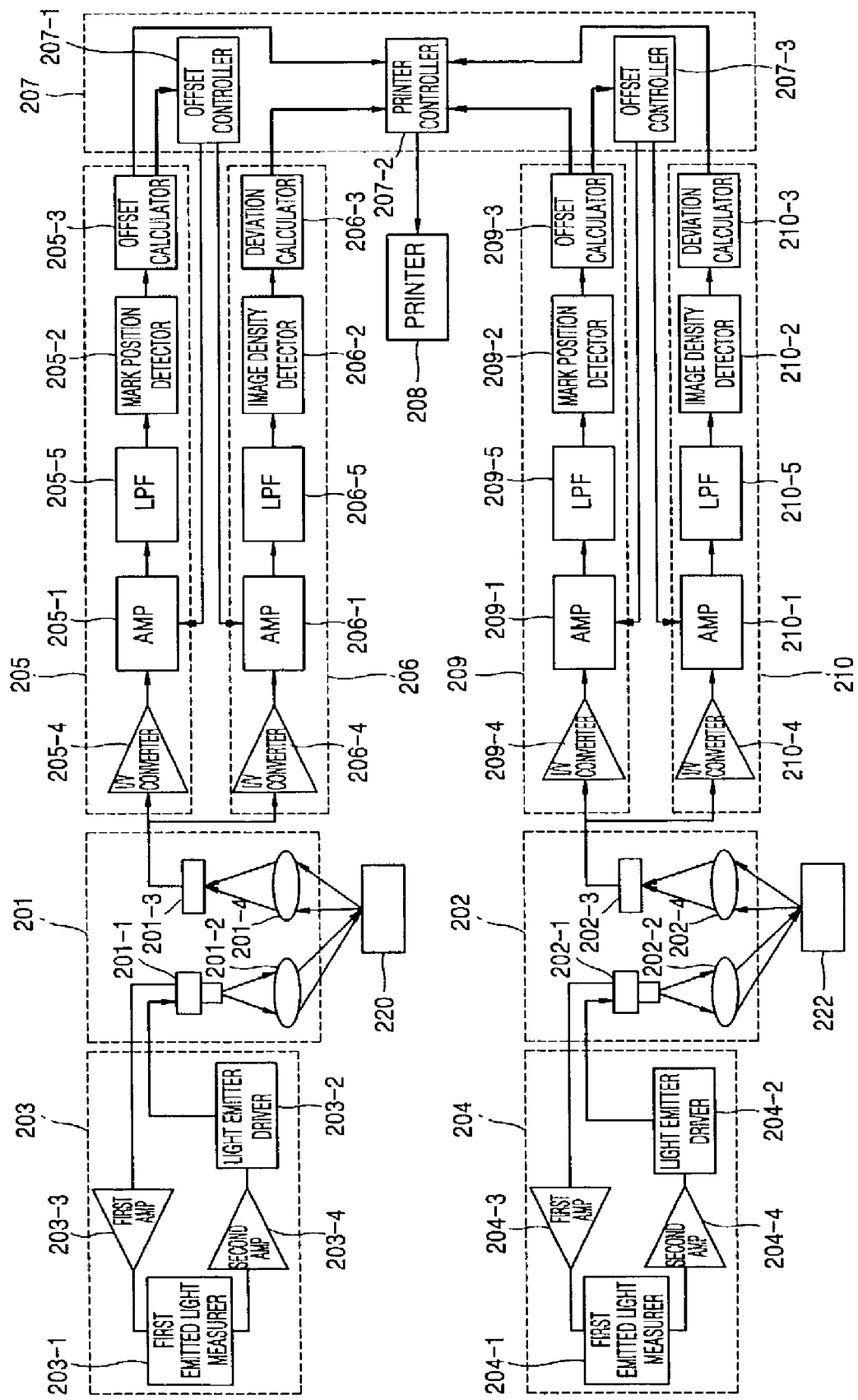
FIG. 15 is a block diagram of an apparatus to control color registration and image density according to a second embodiment of the present invention.

FIG. 15 is a block diagram of an apparatus to control color registration and image density according to another embodiment of the present invention. Referring to FIG. 15, the apparatus includes two color registration and image density sensors provided on the left and right sides and a pair of color registration mark patterns or two image density mark patterns provided on the left and right sides.

A first registration and image density sensor includes a first optical module 201, a first light emitter control unit 203, a first color registration control unit 205, a first image density control unit 206, and a system control unit 207. A second registration and image density sensor includes a second optical module 202, a second light emitter control unit 204, a second color registration control unit 209, a second image density control unit 210, and the system control unit 207.

The first and second optical modules 201 and 202 include light emitters to radiate beams onto first and second mark patterns 220 and 222, respectively, and light receivers to receive beams reflected from the first and second mark patterns 220 and 222, respectively. The light emitters include light sources 201-1 and 202-1, respectively, to generate and emit light beams, and focusing lenses 201-2 and 202-2, respectively, to focus the beams emitted from the respective light sources 201-1 and 202-1 onto the first and second mark patterns 220 and 222, respectively. Laser diodes are used as the light sources 201-1 and 202-1.

The light receivers include photodetectors 201-3 and 202-3, respectively, to receive the emitted beams and perform photoelectric conversion, and focusing lenses 201-4 and 202-4, respectively, to focus the light beams emitted from the respective light emitters and reflected from the respective first and second mark patterns 220 and 222 onto the photodetectors 201-3 and 202-3, respectively.

The first and second light emitter control units 203 and 204 detect the amount of light emitted from the respective light emitters and control the light emitters to maintain a constant emission. Each of the first and second light emitter control units 203 and 204 includes a first AMP 203-3 or 204-3 to amplify a signal representing the amount of light of beams emitted from the light source 201-1 or 202-1, and an emitted light measurer 203-1 or 204-1 to receive an output signal of the first AMP 203-3 or 204-3 and measure the amount of light emitted from each of the light emitters. The first and second light emitter control units 203 and 204 each further include a second AMP 203-4 or 204-4 to amplify an emitted light amount signal output from the emitted light measurer 203-1 or 204-1, and a light emitter driver 203-2 or 204-2 to receive the output signal of the second AMP 203-4 or 204-4 and to control the amount of light emitted from each of the light emitters.

Current signals produced by the respective light receivers are transmitted to the first and second color registration control units 205 and 209, respectively, and to the first and second image density control units 206 and 210, respectively. The first and second color registration control units 205 and 209 obtain information to compensate for color registration errors from the current signal produced by the respective light receivers.

The first and second color registration control units 205 and 209 include I/V converters 205-4 and 209-4 to convert the current signals produced by the respective light receivers into voltage signals, AMPs 205-1 and 209-1 to amplify the voltage signals from the respective I/V converters 205-4 and 209-4, LPFs 205-5 and 209-5 to pass only low frequency bands of the respective amplified signals, mark position detectors 205-2 and 209-2 to detect the positions of the first and second mark patterns 220 and 222 from signals received from the respective LPFs 205-5 and 209-5, and offset calculators 205-3 and 209-3 to calculate offsets from the values of the respective detected mark positions. Here, the offsets include information about X-offset, Y-offset, printing width error, and skew.

The first and second image density control units 206 and 210 include I/V converters 206-4 and 210-4 to convert the current signals produced by the respective light receivers into voltage signals, AMPs 206-1 and 210-1 to amplify the voltage signals from the respective I/V converters 206-4 and 210-4, LPFs 206-5 and 210-5 to pass only low frequency bands of the respective amplified signals, image density detectors 206-2 and 210-2 to detect image density attributes for different colors from output signals of the respective LPFs 206-5 and 210-5, and deviation calculators 206-3 and 210-3 to compare the detected image density attributes with reference image density attributes and to calculate the deviation.

The system control unit 207 includes a printer controller 207-2 to receive information to compensate for color registration error and image density error from the first and second color registration control units 205 and 209 and the first and second image density control units 206 and 210, and to control a printer 208, and an offset controller 207-1 to change the output values of the AMPs 205-1 and 206-1 to compensate for a difference in the amount of light of beams reflected from the first and second mark patterns 220 and 222. The system control unit 207 also includes an offset controller 207-3 to change the output values of the AMPs 209-1 and 210-1 to compensate for a difference in the amount of light of beams reflected from the first and second mark patterns 220 and 222.

Figure 16:
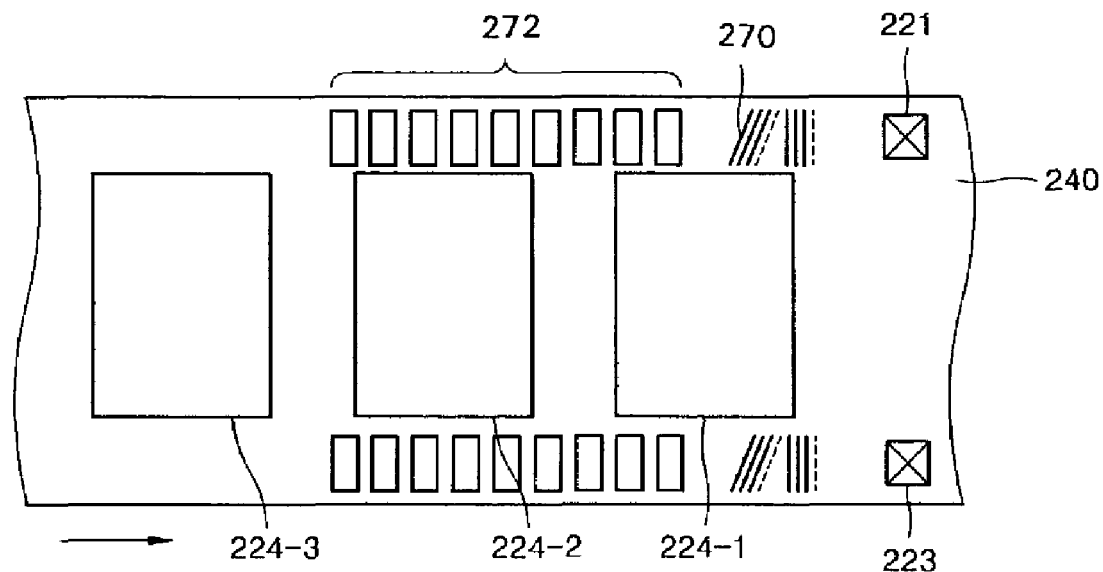
FIG. 16 is a diagram of a color registration mark pattern and an image density mark pattern according to the second embodiment of the present invention.

FIG. 16 shows an image density mark pattern and a registration mark pattern formed on a transfer belt of an apparatus to control color registration and an image density according to the second embodiment of the present invention. Referring to FIG. 16, first through third image areas 224-1, 224-2, and 224-3 are disposed in the middle of a transfer belt 240. An image density mark pattern 272 and a registration mark pattern 270 are arranged in a cross-scan direction on each of the right and left sides of the transfer belt 240.

Color registration and image density sensors 221 and 223 are provided above the transfer belt 240. Each of the registration and image density sensors 221 and 223 radiates a beam onto a portion of the image density mark pattern 272 or the registration mark pattern 270 when the image density mark pattern 272 or the registration mark pattern 270 passes the sensor as the transfer belt 240 moves in a cross-scan direction and produces a detection signal.

Figure 17:
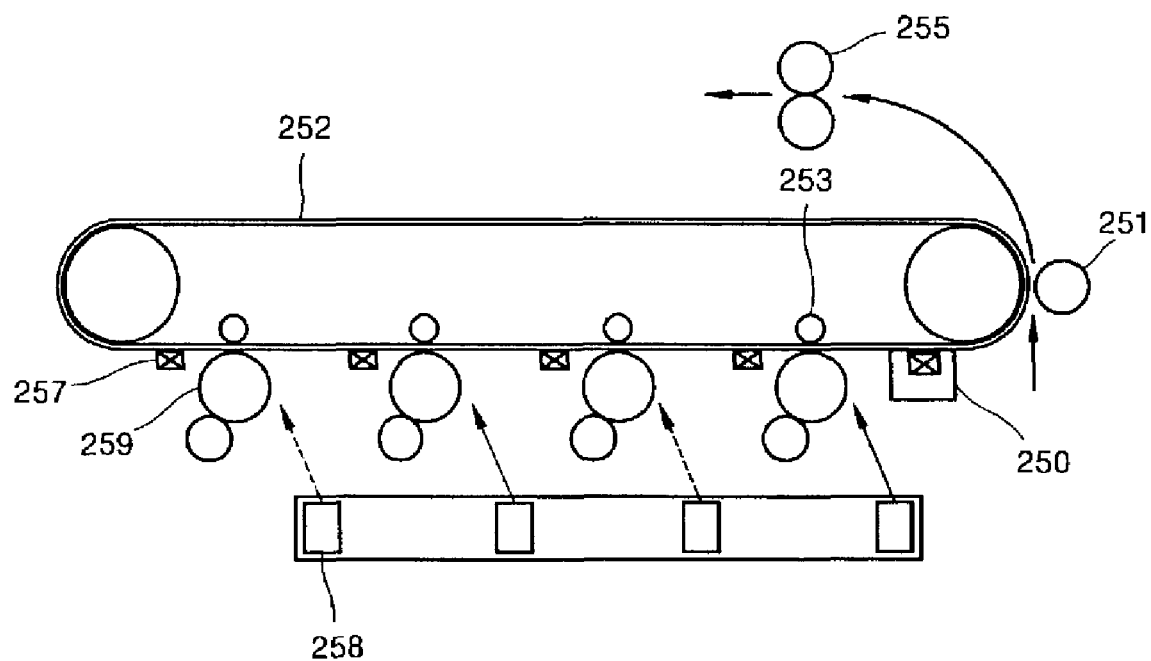
FIG. 17 is a sectional view of a printer in which the apparatus to control color registration and image density according to the second embodiment of the present invention is installed.

FIG. 17 is a sectional view of a printer in which an apparatus to control color registration and an image density according to the second embodiment of the present invention is installed. Referring to FIG. 17, a color registration and image density sensor 250 (identical to sensors 221 and 223) is provided between an LSU 258 and a transfer roll 251. A tof/weaving sensor 257 is provided between a charger (not shown) and the LSU 258. Here, reference numeral 253 denotes a belt drive roll, reference numeral 255 denotes a dry/fixing device, and reference numeral 252 denotes an intermediate transfer belt.

Figure 18:
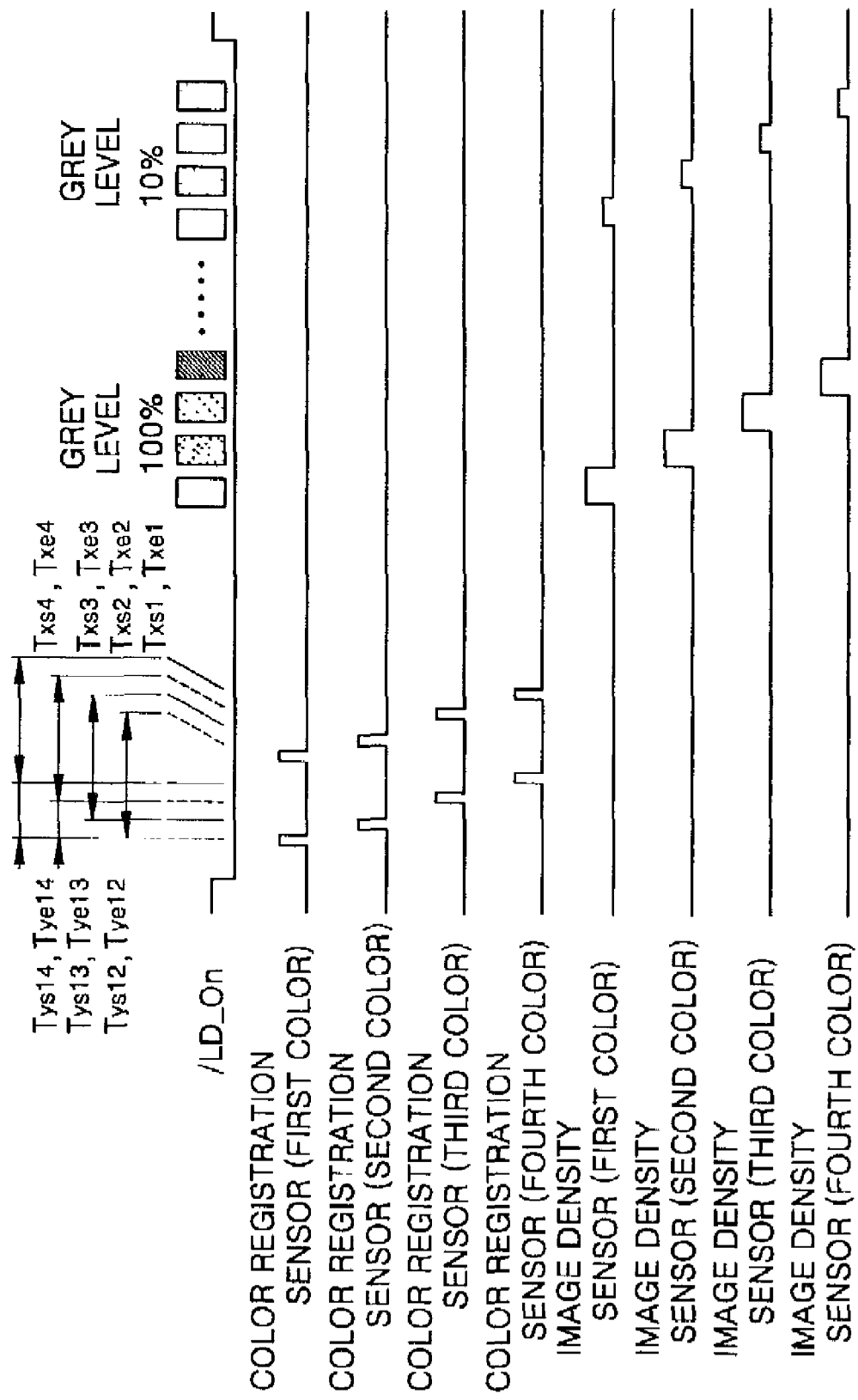
FIG. 18 is a diagram of signals according to color produced by a color registration and image density sensor according to a second arrangement of registration marks of the present invention.

FIG. 18 is a graph of signals produced for registration marks and image density marks by a color registration and image density sensor according to the second embodiment of the present invention. In a graph of a signal produced by a color registration sensor for a first color registration mark, it can be seen that the signal includes a scan direction component pulse and a slanting direction component pulse at positions corresponding to the first color registration mark. Graphs of signals produced for second through fourth color registration marks can be described in the same manner as the graph of the signal produced for the first color registration mark.

Unlike the color registration marks shown in FIG. 12, the scan direction component and the slanting direction component of the same color registration mark are not sequential in FIG. 18. In FIG. 18, the scan direction components of the respective first through fourth color registration marks appear sequentially, and then the slanting direction components of the respective first through fourth color registration marks appear.

Here, $T_{y2}$ indicates the time interval between the scan direction components of the respective first and second color registration marks. $T_{y3}$ indicates the time interval between the scan direction components of the respective first and third color registration marks. $T_{y4}$ indicates the time interval between the scan direction components of the respective first and fourth color registration marks.

For image density marks, marks having a grey level of 10% for first through fourth colors are arranged in line to thus form a unit set, and consecutively, a set of marks having a grey level of 20% for the first through fourth colors are arranged in line. With such an arrangement, sets of image density marks for the first through fourth colors having grey levels of 10 through 100%, increasing in steps of 10%, are arranged.

In FIG. 18, image density signals produced by the color registration and image density sensor are sequentially illustrated with respect to the image density marks for the first through fourth colors. As shown in FIG. 18, when the grey level of an image density mark is 100%, the power of the detection signal is greatest. The power of a detection signal decreases as the grey level decreases.

FIG. 19 shows methods of calculating color registration errors. First through fourth color registration marks formed on the left and right sides of a transfer belt are shown in the upper portion of FIG. 19, and methods of calculating X-offset, Y-offset, printing width error, and skew with respect to the second through fourth color registration marks are shown in the lower portion of FIG. 19.

The arrangement of registration marks shown in FIG. 19 is different from that shown in FIG. 13, but the method of calculating X-offset, Y-offset, printing width error, and skew shown in FIG. 19 is the same as that shown in FIG. 13. Thus, a repeat description will be omitted.

Figure 20:
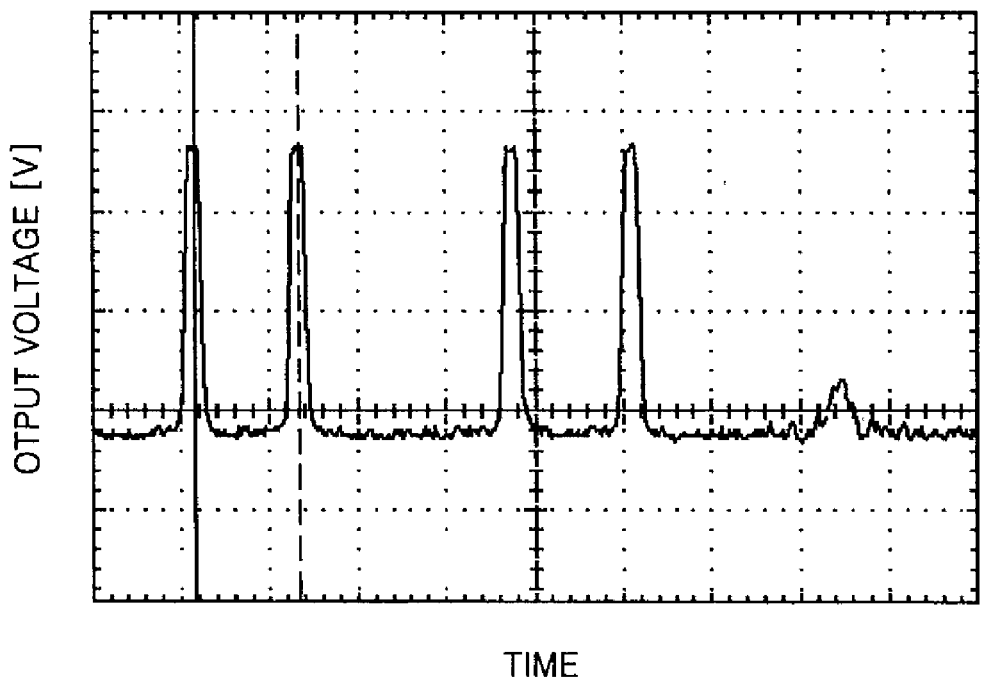
FIG. 20 shows a color registration signal produced by the color registration and image density sensor according to the second embodiment of the present invention.

FIG. 20 is a graph of the result of amplifying a signal produced with respect to registration marks. Unlike FIG. 14, a signal with respect to a color registration mark for the same color does not appear as a pulse pair but as a single pulse. An offset can be calculated from the time interval between pulses.

Figure 21:
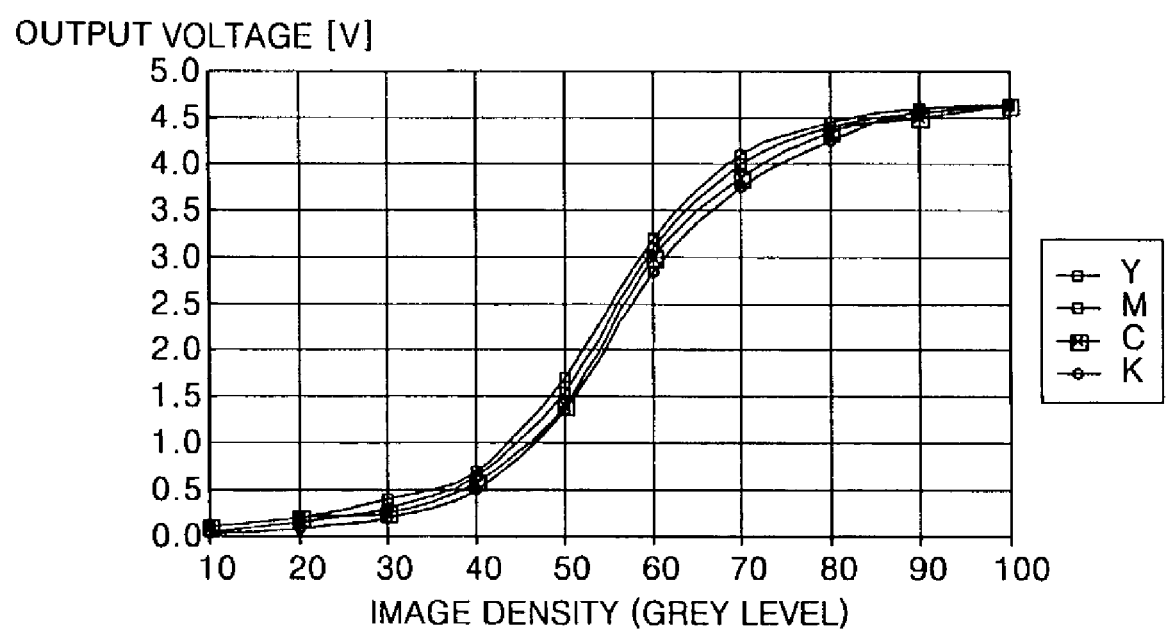
FIG. 21 shows an image density signal produced by the color registration and image density sensor according to the second embodiment of the present invention.

FIG. 21 is a graph of a signal produced with respect to image density marks. It can be seen that image density, i.e., output voltage, with respect to a grey level, gradually increases as the grey level increases. An error can be calculated by comparing the output voltage of the image density detection signal produced in a printer with a graph of a reference image density detection signal.

A method of calculating errors using a color registration and image density sensor according to the present invention further includes calculating an image density error by comparing the output voltage detected with respect to each grey level of an image density of each color with a reference value, in addition to a method of calculating color registration errors.

According to an apparatus to control color registration and image density and a method of calculating color registration error and image density error according to the embodiments of the present invention, color registration and image density can be detected using a single sensor. X-offset, Y-offset, printing width error, and skew can be simultaneously detected and used to compensate for registration error. In addition, the image density of each color can be detected.

Although a few preferred embodiments of the present invention have been shown and described, it will be appreciated by those skilled in the art that changes may be made in these embodiments without departing from the principles and spirit of the invention, the scope of which is defined in the claims and their equivalents. For example, those skilled in the art can change the form of a registration mark pattern when configuring the apparatus to control registration, without departing from the spirit and scope of the present invention.

As described above, in an apparatus to control color registration and a method of calculating registration error according to the present invention, four kinds of offset can be simultaneously detected using registration marks including a scan direction component and a slanting direction component, and registration error can be compensated for based on the detected offsets, thereby reducing detected error.

In an apparatus to control color registration and an image density according to the present invention, both color registration and image density can be detected by a single sensor, so X-offset, Y-offset, printing width error, skew, and image density error can be simultaneously compensated for.

What is claimed is:

1. An apparatus for controlling color registration and an image density, comprising:

registration marks for different colors arranged on an image carrying member of a printer in a cross-scan direction, the image carrying member movable in the cross-scan direction;

image density marks for different colors arranged on the image carrying member in a cross-scan direction, each of the image density marks for different colors having a plurality of gray level marks;

an optical module disposed at a fixed position with respect to the image carrying member so as to detect the registration marks arranged thereon as the image carrying member moves in the cross-scan direction, wherein the optical module further detects the image density marks arranged thereon as the image carrying member moves in the cross-scan direction while the optical module remains in the same fixed position with respect to the image carrying member, optical module comprising a light emitter to radiate a spot shaped beam onto the registration marks and the image density marks and a light receiver to receive the beam reflected from the registration marks and the image density marks; and a controller to control the printer to compensate for a color registration error and an image density error based on detection signals of the optical module corresponding to the registration marks for different colors and the plurality of gray level marks of each of the image density marks for different colors, respectively, wherein the registration marks comprise a first set of registration marks and a second set of registration marks, wherein the first set of registration marks and the second set of registration marks are separated from each other in a scan direction, wherein the image density marks comprise a first set of image density marks and a second set of image density marks, wherein the first set of image density marks and the second set of image density marks are separated from each other in the scan direction, wherein the first set of image density marks includes:
image density marks corresponding to a first color,
image density marks corresponding to a second color,
image density marks corresponding to a third color, and
image density marks corresponding to a fourth color, wherein the second set of image density marks includes:
image density marks corresponding to the first color,
image density marks corresponding to the second color,
image density marks corresponding to the third color, and
image density marks corresponding to the fourth color, the optical module includes a first optical module to detect the first set of registration marks and the first set of image density marks, and a second optical module that is separated from the first optical module in the scan direction and detects the second set of registration marks and the second set of image density marks.

2. The apparatus of claim 1, wherein the controller comprises:
a color registration control unit for obtaining information to compensate for the color registration error from detection signals produced by the light receiver;
an image density control unit to obtain information for compensating for the image density error from the detection signals produced by the light receiver; and
a system control unit to receive the information for compensating for color registration error and the information for compensating for image density error and control the color registration control unit, the image density control unit, and the printer.

3. The apparatus of claim 2, wherein each of the color registration control unit and the image density control unit comprises:
an amplifier to amplify detection signals from the light receiver; and
a Low Pass Filter to filter noise signals of an output signal of the amplifier.

4. The apparatus of claim 3, wherein the color registration control unit further comprises:
a mark position detector for detecting the positions of the registration marks from an output signal of the Low Pass Filter; and
an offset calculator for calculating offsets from the detected positions of the registration marks.

5. The apparatus of claim 4, wherein the image density control unit further comprises:
an image density detector for detecting attributes of image densities for different colors from signals received from the Low Pass Filter; and
a deviation calculator for comparing the detected attributes with reference to attribute and calculating the deviation therebetween.

6. The apparatus of claim 5, wherein the system control unit comprises:

an offset controller for changing output values of the amplifier to compensate for differences in amount of light of the beams reflected from the color registration marks or the image density marks of different colors; and
a printer controller for receiving offset information from the offset calculator and the deviation from the deviation calculator and controlling the printer.

7. The apparatus of claim 1, wherein each of the registration marks comprises a scan direction component and a slanting direction component at an angle to both the scan direction and the cross-scan direction.

8. The apparatus of claim 1, wherein the first set of registration marks and the second set of registration marks are respectively arranged on opposite sides of an image area of the image carrying member.

9. The apparatus of claim 1, wherein the first set of image density marks and the second set of image density marks are respectively arranged on both sides of the image area of the image carrying member.

10. The apparatus of claim 1, wherein the light emitter comprises:
a light source emitting beams; and
a converging lens to converge the beams emitted from the light source onto the registration marks or the image density marks.

11. The apparatus of claim 10, wherein the light source is a laser diode.

12. The apparatus of claim 10, further comprising a light emitter control unit comprising:
an emitted light measurer for detecting the amount of light emitted from the light emitter; and
a light emitter driver for comparing the amount of light detected by the emitted light measurer with a reference amount and driving the light emitter such that the amount of light emitted from the light emitter is constant.

13. The apparatus of claim 1, wherein the size of the spot shaped beam is 200 µm or less.

14. The apparatus of claim 1, wherein the light receiver comprises:
a photodetector receiving beams and performing photoelectric conversion; and
a converging lens to converge the beams reflected from the registration marks or the image density marks onto the photodetector.

15. The apparatus of claim 14, wherein the light receiver receives a diffused beam from the image carrying member.

16. The apparatus of claim 1, wherein the image carrying member comprises a transfer belt, and the image density marks comprise a plurality of gray level toner patches formed on the transfer belt,
wherein the controller controls the printer to compensate for image density error based on detection signals of the optical module corresponding to the plurality of gray level toner patches formed on the transfer belt.

17. The apparatus of claim 16, wherein the registration marks and the image density marks are arranged on the transfer belt in a single line in the cross-scan direction,
wherein the same light emitter and light receiver are used to detect the registration marks and the image density marks arranged on the transfer belt in the single line in the cross-scan direction.

18. An image forming apparatus comprising:
an image carrying member of a printer, movable in a cross-scan direction and on which a plurality of images having different colors are transferred;

a registration mark generator to form registration marks for different colors on the image carrying member in the cross-scan direction of the image forming apparatus;

an image density mark generator to form image density marks for different colors on the image carrying member in the cross-scan direction, each of the image density marks for different colors having a plurality of gray level marks;

an optical module disposed at a fixed position with respect to the image carrying member so as to detect the registration marks formed thereon as the image carrying member moves in the cross-scan direction, wherein the optical module is further capable of detecting the image density marks arranged thereon as the image carrying member moves in the cross-scan direction while the optical module remains in the same fixed position with respect to the image carrying member, the optical module comprising a light emitter to radiate a spot shaped beam onto the registration marks and the image density marks and a light receiver to receive the beam reflected from the registration marks and the image density marks; and a controller to control the image forming apparatus to compensate for a color registration error and an image density error based on detection signals of the optical module corresponding to the registration marks for different colors and the plurality of gray level marks of each of the image density marks for different colors, respectively, wherein the registration marks comprise a first set of registration marks and a second set of registration marks, wherein the first set of registration marks and the second set of registration marks are separated from each other in a scan direction, wherein the image density marks comprise a first set of image density marks and a second set of image density marks, wherein the first set of image density marks and the second set of image density marks are separated from each other in the scan direction, wherein the first set of image density marks includes:
image density marks corresponding to a first color,
image density marks corresponding to a second color,
image density marks corresponding to a third color, and
image density marks corresponding to a fourth color, wherein the second set of image density marks includes:
image density marks corresponding to the first color,
image density marks corresponding to the second color,
image density marks corresponding to the third color, and
image density marks corresponding to the fourth color, the optical module includes a first optical module to detect the first set of registration marks and the first set of image density marks, and a second optical module that is separated from the first optical module in the scan direction and detects the second set of registration marks and the second set of image density marks.

19. The apparatus of claim 18, wherein each of the first set of registration marks and the second set of registration marks comprises a scan direction component and a slanting direction component at an angle to both the scan direction and a cross-scan direction.

20. The apparatus of claim 19, wherein the first and second registration marks are disposed in opposite sides of an imaging area of the image carrying member, respectively.

21. The apparatus of claim 18, wherein the size of the spot shaped beam is 200 μm or less.

22. The apparatus of claim 18, wherein the image carrying member is an image carrying member of a printer, the image carrying member comprises a transfer belt, and the image density marks comprise a plurality of gray level toner patches formed on the transfer belt, wherein the controller controls the printer to compensate for image density error based on detection signals of the optical module corresponding to the plurality of gray level toner patches formed on the transfer belt.

23. The apparatus of claim 22, wherein the registration marks and the image density marks are arranged on the transfer belt in a single line in the cross-scan direction, wherein the same light emitter and light receiver are used to detect the registration marks and the image density marks arranged on the transfer belt in the single line in the cross-scan direction.

* * * * *

UNITED STATES PATENT AND TRADEMARK OFFICE
CERTIFICATE OF CORRECTION

PATENT NO. : 7,658,462 B2  Page 1 of 1
APPLICATION NO. : 10/232314
DATED : February 9, 2010
INVENTOR(S) : Yoon-seop Eom It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2105 days.

Signed and Sealed this

Twenty-eighth Day of December, 2010

David J. Kappos
*Director of the United States Patent and Trademark Office*